(12) United States Patent
Rawlings et al.

(10) Patent No.: US 9,751,618 B2
(45) Date of Patent: Sep. 5, 2017

(54) OPTICAL EFFECTS FOR AERODYNAMIC MICROSTRUCTURES

(71) Applicant: The Boeing Company, Chicago, IL (US)

(72) Inventors: Diane C. Rawlings, Bellevue, WA (US); Timothy Leroy Williams, Burien, WA (US); James C. McGarvey, Issaquah, WA (US); James M. Kestner, Seattle, WA (US); Alan G. Burg, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 14/705,547

(22) Filed: May 6, 2015

(65) Prior Publication Data
US 2016/0325823 A1   Nov. 10, 2016

(51) Int. Cl.
| | |
|---|---|
| *B64C 1/38* | (2006.01) |
| *B64C 21/10* | (2006.01) |
| *B44F 1/02* | (2006.01) |
| *B64C 23/00* | (2006.01) |
| *B64D 45/00* | (2006.01) |
| *G09F 19/12* | (2006.01) |
| *G09F 19/14* | (2006.01) |
| *B42D 25/324* | (2014.01) |
| *G09F 21/08* | (2006.01) |
| *B41M 3/00* | (2006.01) |

(52) U.S. Cl.
CPC ............ *B64C 21/10* (2013.01); *B42D 25/324* (2014.10); *B44F 1/02* (2013.01); *B64C 23/00* (2013.01); *B64D 45/00* (2013.01); *G09F 19/12* (2013.01); *G09F 19/14* (2013.01); *G09F 21/08* (2013.01); *B41M 3/00* (2013.01); *B64C 2230/26* (2013.01); *Y02T 50/166* (2013.01)

(58) Field of Classification Search
CPC ........... B64C 21/10; B64C 23/00; B44F 1/02; B64D 45/00; G09F 19/12; G09F 19/14; G09F 21/08
See application file for complete search history.

(56) References Cited

U.S. PATENT DOCUMENTS

| 4,650,138 A | 3/1987 | Grose |
| 4,706,910 A | 11/1987 | Walsh et al. |

(Continued)

FOREIGN PATENT DOCUMENTS

| EP | 2070688 | 6/2009 |
| WO | 03000483 | 1/2003 |

OTHER PUBLICATIONS

Embossing of Nanoscale Features and Environments, BG Casey, W. Monaghan and CDW Wilkinson. Microelectronic Engineering 35 (1997) 393-396.*

(Continued)

*Primary Examiner* — Philip J Bonzell
(74) *Attorney, Agent, or Firm* — Hanley, Flight & Zimmerman, LLC

(57) ABSTRACT

Aerodynamic microstructures having sub-microstructure are disclosed herein. One disclosed example apparatus includes an aerodynamic microstructure defining an external surface of a vehicle, and a pattern of sub-microstructures superimposed on the microstructure to convey a representation of an image.

19 Claims, 15 Drawing Sheets

(56) References Cited

U.S. PATENT DOCUMENTS

| | | | |
|---|---|---|---|
| 4,736,912 A | 4/1988 | Loebert | |
| 4,865,271 A | 9/1989 | Savill | |
| 4,930,729 A | 6/1990 | Savill | |
| 4,932,612 A | 6/1990 | Blackwelder et al. | |
| 5,054,412 A | 10/1991 | Reed et al. | |
| 5,069,403 A * | 12/1991 | Marentic | B05D 5/02 |
| | | | 244/130 |
| 5,133,516 A * | 7/1992 | Marentic | B05D 5/02 |
| | | | 244/130 |
| 5,133,519 A | 7/1992 | Falco | |
| 5,445,095 A | 8/1995 | Reed et al. | |
| 5,505,543 A | 4/1996 | Webbeking et al. | |
| 5,520,717 A | 5/1996 | Miller et al. | |
| 5,637,873 A | 6/1997 | Davis et al. | |
| 5,766,306 A | 6/1998 | Olli et al. | |
| 5,766,764 A | 6/1998 | Olli et al. | |
| 5,860,626 A | 1/1999 | Moser | |
| 5,874,167 A | 2/1999 | Rawlings et al. | |
| 5,971,326 A | 10/1999 | Bechert | |
| 6,177,189 B1 | 1/2001 | Rawlings et al. | |
| 6,191,248 B1 | 2/2001 | Rawlings et al. | |
| 6,345,791 B1 * | 2/2002 | McClure | B63B 1/34 |
| | | | 244/130 |
| 6,376,063 B1 | 4/2002 | Rasmussen et al. | |
| 6,475,616 B1 | 11/2002 | Dietz et al. | |
| 6,699,579 B2 | 3/2004 | Rasmussen et al. | |
| 6,958,207 B1 * | 10/2005 | Khusnatdinov | G02B 1/11 |
| | | | 430/321 |
| 6,982,794 B1 | 1/2006 | Davis et al. | |
| 6,994,045 B2 * | 2/2006 | Paszkowski | B63B 1/38 |
| | | | 114/67 R |
| 7,041,363 B2 | 5/2006 | Krohmer et al. | |
| 7,044,073 B2 | 5/2006 | Goldstein | |
| 7,052,586 B2 | 5/2006 | Rasmussen et al. | |
| 7,070,850 B2 * | 7/2006 | Dietz | B32B 27/08 |
| | | | 244/130 |
| 7,221,513 B2 | 5/2007 | Cho et al. | |
| 7,224,529 B2 | 5/2007 | King et al. | |
| 7,298,554 B2 | 11/2007 | Cho et al. | |
| 7,417,798 B2 | 8/2008 | King et al. | |
| 7,444,932 B2 | 11/2008 | Strand et al. | |
| 7,445,409 B2 * | 11/2008 | Trice | B23B 27/06 |
| | | | 29/557 |
| 7,525,785 B2 | 4/2009 | Rawlings | |
| 7,544,407 B1 | 6/2009 | Rawlings et al. | |
| 7,678,997 B2 | 3/2010 | Rawlings | |
| 7,703,179 B2 | 4/2010 | Ferguson et al. | |
| 7,755,670 B2 | 7/2010 | Utagawa | |
| 7,757,591 B2 * | 7/2010 | Trice | B23B 27/04 |
| | | | 407/113 |
| 7,807,229 B2 | 10/2010 | Rawlings et al. | |
| 7,864,501 B2 | 1/2011 | Rawlings et al. | |
| 7,867,621 B2 | 1/2011 | Rawlings et al. | |
| 7,931,841 B2 | 4/2011 | Huizinga et al. | |
| 7,940,462 B2 * | 5/2011 | Noguchi | G02B 1/118 |
| | | | 359/619 |
| 8,038,102 B2 | 10/2011 | Miller et al. | |
| 8,113,469 B2 | 2/2012 | Lang | |
| 8,220,754 B2 | 7/2012 | McClure et al. | |
| 8,286,909 B2 | 10/2012 | Lee | |
| 8,292,226 B2 | 10/2012 | Sankrithi et al. | |
| 8,343,298 B2 | 1/2013 | Rawlings et al. | |
| 8,413,928 B2 | 4/2013 | Rawlings et al. | |
| 8,444,092 B2 * | 5/2013 | Li | B21B 1/227 |
| | | | 244/130 |
| 8,460,779 B2 * | 6/2013 | Gupta | B64C 21/10 |
| | | | 428/156 |
| 8,578,747 B2 | 11/2013 | Li et al. | |
| 8,668,166 B2 * | 3/2014 | Rawlings | B32B 3/30 |
| | | | 244/130 |
| 8,678,316 B2 * | 3/2014 | Rawlings | B32B 3/08 |
| | | | 244/130 |
| 8,684,310 B2 * | 4/2014 | Rawlings | B32B 3/30 |
| | | | 244/130 |
| 8,687,342 B2 | 4/2014 | Rawlings et al. | |
| 8,715,824 B2 * | 5/2014 | Rawlings | B32B 15/08 |
| | | | 428/337 |
| 8,733,702 B1 * | 5/2014 | Rawlings | B64C 23/005 |
| | | | 156/230 |
| 8,794,574 B2 | 8/2014 | Lang | |
| 8,870,124 B2 | 10/2014 | Ireland | |
| 8,876,052 B2 | 11/2014 | Rawlings et al. | |
| 9,017,797 B2 | 4/2015 | Goelling | |
| 9,272,791 B2 | 3/2016 | Brennan et al. | |
| 9,297,394 B2 | 3/2016 | Li et al. | |
| 9,352,533 B2 | 5/2016 | Rawlings et al. | |
| 9,371,141 B2 | 6/2016 | Rawlings et al. | |
| 2003/0133121 A1 | 7/2003 | Davis et al. | |
| 2004/0126541 A1 | 7/2004 | Dietz et al. | |
| 2004/0200932 A1 | 10/2004 | Scott et al. | |
| 2005/0094277 A1 * | 5/2005 | Khusnatdinov | F41H 3/00 |
| | | | 359/601 |
| 2005/0181203 A1 | 8/2005 | Rawlings et al. | |
| 2006/0051592 A1 | 3/2006 | Rawlings et al. | |
| 2006/0060722 A1 | 3/2006 | Choi et al. | |
| 2007/0060026 A1 | 3/2007 | Sung | |
| 2007/0194178 A1 * | 8/2007 | Lang | B64C 21/10 |
| | | | 244/130 |
| 2007/0257400 A1 | 11/2007 | Stenzel et al. | |
| 2008/0061192 A1 | 3/2008 | Sullivan | |
| 2008/0233356 A1 | 9/2008 | Loher et al. | |
| 2010/0080958 A1 | 4/2010 | Goelling | |
| 2010/0108813 A1 * | 5/2010 | Lang | B63B 1/36 |
| | | | 244/130 |
| 2010/0127125 A1 | 5/2010 | Li et al. | |
| 2010/0187360 A1 | 7/2010 | Rawlings et al. | |
| 2010/0187361 A1 | 7/2010 | Rawlings et al. | |
| 2010/0282909 A1 * | 11/2010 | Rawlings | B32B 15/06 |
| | | | 244/130 |
| 2010/0308177 A1 | 12/2010 | McClure et al. | |
| 2011/0006165 A1 | 1/2011 | Ireland | |
| 2011/0008174 A1 | 1/2011 | Ireland | |
| 2011/0073710 A1 * | 3/2011 | Rawlings | B64C 21/10 |
| | | | 244/130 |
| 2011/0186685 A1 | 8/2011 | Tsotsis et al. | |
| 2011/0262705 A1 | 10/2011 | Gupta et al. | |
| 2011/0274875 A1 | 11/2011 | Lang | |
| 2012/0025025 A1 | 2/2012 | Brennan et al. | |
| 2012/0227453 A1 | 9/2012 | Li et al. | |
| 2013/0028744 A1 | 1/2013 | Nordin et al. | |
| 2013/0062004 A1 | 3/2013 | Amirehteshami et al. | |
| 2013/0107278 A1 | 5/2013 | Meyer et al. | |
| 2013/0193270 A1 | 8/2013 | Rawlings et al. | |
| 2013/0257055 A1 | 10/2013 | Simpson | |
| 2014/0023837 A1 | 1/2014 | Miller et al. | |
| 2014/0099475 A1 | 4/2014 | Rawlings et al. | |
| 2014/0110263 A1 | 4/2014 | Barbier et al. | |
| 2014/0116597 A1 | 5/2014 | Miller et al. | |
| 2014/0130318 A1 | 5/2014 | Rohr et al. | |
| 2014/0174642 A1 | 6/2014 | Rawlings et al. | |
| 2014/0238646 A1 | 8/2014 | Enright | |
| 2014/0242285 A1 | 8/2014 | Pettersson et al. | |
| 2014/0248453 A1 | 9/2014 | Li et al. | |
| 2014/0248469 A1 | 9/2014 | Rawlings et al. | |
| 2014/0255632 A1 | 9/2014 | Gradert et al. | |
| 2014/0272237 A1 | 9/2014 | Roper et al. | |
| 2014/0295143 A1 | 10/2014 | Rawlings et al. | |
| 2014/0332631 A1 | 11/2014 | Rawlings et al. | |
| 2014/0356219 A1 | 12/2014 | Gammel et al. | |
| 2014/0363637 A1 | 12/2014 | Kovach et al. | |
| 2015/0017385 A1 | 1/2015 | Lang | |
| 2015/0053289 A1 | 2/2015 | Kurtovic et al. | |
| 2015/0136909 A1 | 5/2015 | Kruckenberg et al. | |
| 2016/0107371 A1 | 4/2016 | Hurme et al. | |
| 2016/0159466 A1 | 6/2016 | Daggett et al. | |
| 2016/0168685 A1 | 6/2016 | Surply et al. | |
| 2016/0243586 A1 | 8/2016 | Travis | |
| 2016/0271930 A1 | 9/2016 | Roper et al. |

(56) References Cited

U.S. PATENT DOCUMENTS

2016/0325818 A1 11/2016 Williams et al.
2016/0325824 A1 11/2016 Rawlings

OTHER PUBLICATIONS

United States Patent and Trademark Office, "Non-Final Office Action," issued in connection with U.S. Appl. No. 14/705,564, mailed on Aug. 10, 2016, 32 pages.

United States Patent and Trademark Office, "Non-Final Office Action," issued in connection with U.S. Appl. No. 14/705,569, mailed on Jun. 21, 2016, 26 pages.

United States Patent and Trademark Office, "Non-Final Office Action," issued in connection with U.S. Appl. No. 14/705,569, mailed on Feb. 1, 2017, 26 pages.

United States Patent and Trademark Office, "Non-Final Office Action," issued in connection with U.S. Appl. No. 14/705,569, mailed on Feb. 1, 2017 (11 pages).

United States Patent and Trademark Office, "Notice of Allowance," issued in connection with U.S. Appl. No. 14/705,564, mailed on Mar. 1, 2017 (5 pages).

European Patent Office, "Extended Search Report," issued in connection with European Patent Application No. 16162961.3, issued on Sep. 13, 2016, 9 pages.

United States Patent and Trademark Office, "Final Office Action," issued in connection with U.S. Appl. No. 14/705,569, mailed on Oct. 14, 2016, 22 pages.

European Patent Office, "Extended European Search Report," issued in connection with European Patent Application No. 16167099.7, issued on Nov. 11, 2016, 8 pages.

European Patent Office, "Extended European Search Report," issued in connection with European Patent Application No. 16167118.5, issued on Nov. 11, 2016, 8 pages.

United States Patent and Trademark Office, "Final Office Action," dated in connection with U.S. Appl. No. 14/705,569, filed May 19, 2017 (10 pages).

* cited by examiner

OPTICAL EFFECTS FOR AERODYNAMIC MICROSTRUCTURES

FIELD OF THE DISCLOSURE

This patent relates generally to microstructures and, more particularly, to optical effects for aerodynamic microstructures.

BACKGROUND

Microstructures are typically used on an aircraft to alter flight characteristics and/or dynamics of the aircraft. In particular, microstructures such as riblets are used on surfaces of an aircraft wing, a fin or a fuselage to reduce drag and/or a drag coefficient of the aircraft, which can result in overall fuel savings and/or reduction in carbon-dioxide emissions, etc. However, riblets and other microstructures can also cause or prevent certain optical/aesthetic/visual effects including high reflectivity, directional reflectiveness, and/or other potential effects to the aesthetics of the aircraft based on their geometry. High reflectivity and the associated directional reflectiveness is often referred to as glint, which can affect the visibility and/or an aesthetic look of an aircraft. Riblets may cause glint in atypical directions due to their geometries, shapes and/or features in comparison to typical aircraft surfaces (e.g., wing surfaces, fuselage surfaces, etc.).

In some situations, reflectivity and/or the overall appearance of the aircraft surfaces may be controlled by adjusting the reflectivity and/or reflection angles from different portions of the aircraft surfaces. Some known solutions to affect the appearance of the aircraft surfaces include low reflectivity optical coatings such as a flat black paint or multilayer film coatings. Other known solutions to alter the reflectivity and/or the appearance of the aircraft include decals, but applying these to aerodynamic surfaces such as riblets can have negative impacts on the aerodynamic properties of the riblets and, thus, may reduce the riblet effectiveness.

SUMMARY

An example apparatus includes an aerodynamic microstructure defining an external surface of a vehicle, and a pattern of sub-microstructures superimposed on the microstructure to convey a representation of an image.

An example method includes providing a first group of sub-microstructures on an external surface of a microstructure. The example method also includes providing a second group of sub-microstructures on or proximate the external surface, where the second group of sub-microstructures is oriented, spaced, shaped or aligned differently from the first group of sub-microstructures to create an optical effect.

Another example method includes receiving an image to be applied to a surface of an aerodynamic microstructure and, based on the received image, providing a pattern of sub-microstructures to the surfaces to create a representation of the received image on the surface.

Another example apparatus includes an aerodynamic microstructure defining an external surface of an aircraft. The example aerodynamic microstructure includes a first sub-microstructure group superimposed on the aerodynamic microstructure. The example aerodynamic microstructure also includes a second sub-microstructure group superimposed on the aerodynamic microstructure and that is different from the first sub-microstructure group, where a combination of the first and second microstructure groups conveys a representation of an image.

Figure 1:
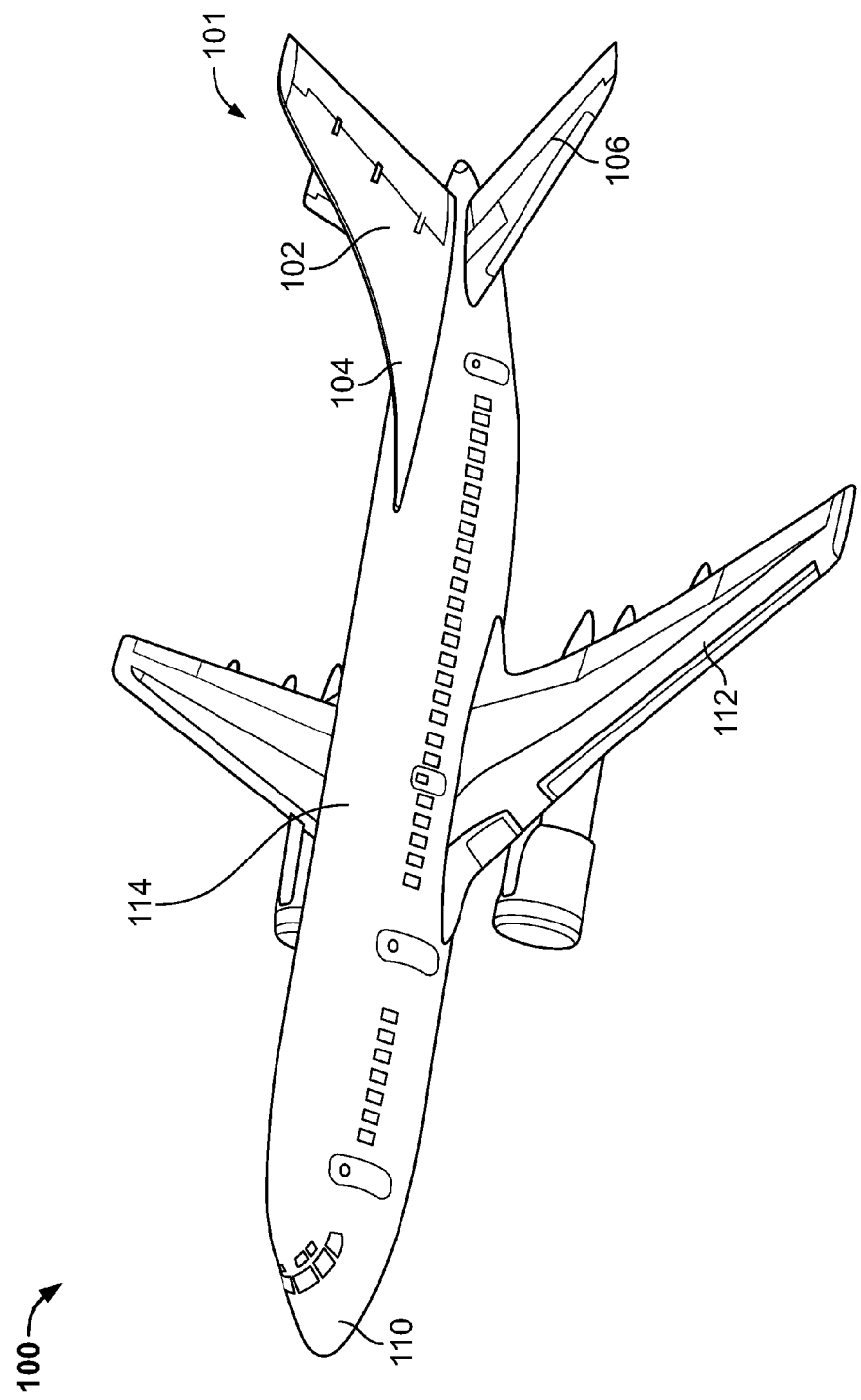
FIG. 1 illustrates an example aircraft that may be used to implement the example methods and apparatus disclosed herein.

Wherever possible, the same reference numbers will be used throughout the drawing(s) and accompanying written description to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Optical effects for aerodynamic microstructures are disclosed herein. Microstructures such as riblets, for example, are typically used on aerodynamic surfaces of an aircraft to alter and/or improve flight characteristics to reduce an overall drag of the aircraft, for example, and, thus, may result in overall fuel savings and/or reduction in carbon-dioxide emissions, etc. However, these riblets and other aerodynamic microstructures can also cause certain associated and/or unintended optical/visual effects including changing the reflectivity at certain angles and/or viewing angles, thereby potentially causing undesirable glints, and/or other potential effects to the aesthetics of the aircraft (e.g., gloss, color effects, color distortions, etc.).

Aircraft and/or external microstructures associated with the aircraft such as riblets may have finished, smooth and/or polished surfaces, which have high reflectivity and may result in Fresnel reflections that can cause glints and/or affect the overall appearance of the aircraft. However, in accordance with the teaching of this disclosure, different reflective surfaces of riblets and/or reflective adjacent surfaces may be used to define a pattern that conveys a representation of an image and/or indicia via an optical effect in which different portion(s) of surfaces reflect differently due to the pattern.

The examples disclosed herein utilize sub-microstructures (e.g., nanostructures) and/or sub-microstructure patterns, which may or may not be nano-scale (e.g., approximately on a scale of $10^{-9}$ meters in dimension(s)), superimposed on or under microstructures (e.g., external aerodynamic microstructures) to control reflections (e.g. Fresnel reflections, etc.) and/or varying degrees of reflectiveness that may be caused by the microstructures, for example. In particular, patterns of sub-microstructures (e.g., sub-microstructures with or without interspersed relatively flat portions and/or different sub-microstructure portions) may be used for such control. In some examples, the microstructures in which the examples are implemented on are riblets applied to a vehicle (e.g., an aircraft, a land based vehicle, a submarine, etc.). These riblets are used for drag coefficient reduction of the vehicle. In some examples, sub-microstructures along with relatively flat portions are used to customize the optics and/or aesthetics of surfaces or features of the vehicle (e.g., an aircraft) on which the example microstructures are provided.

The examples disclosed herein allow control of visual appearances including reflectiveness at certain areas of vehicle surfaces to reduce or increase reflections and/or glint from various locations or positions to achieve desired optical effects. The examples disclosed herein also enable implementation of customized optical effects on the vehicles. In particular, some examples allow certain aesthetic features such as an image, indicia and/or a color layer to be viewed from certain pre-defined angles by limiting or increasing reflectivity or transmissivity at certain positions and/or viewing angles relative to portions of a viewable external surface of a vehicle, for example. In examples where a color layer is used, the color layer may be mechanically coupled to microstructures, integral with the microstructures and/or used in conjunction with sub-microstructures for different decorative and/or reflective effects. In some examples, the color layer and/or the microstructures may have interface features (e.g. a textured surface) between the color layer and the microstructures for different optical, aesthetic and/or decorative effects such as light refractive effects and/or diffractive effects from the microstructures and/or layers (e.g., color layers) embedded within the microstructures.

In some examples, to modify the appearance of a microstructure, sub-microstructures and/or groups of sub-microstructures are provided to the microstructure by machining or any other appropriate processing. In particular, the sub-microstructures may be formed on the microstructure via roll-forming or embossing processes, for example. In some of the examples disclosed herein, the sub-microstructures are formed on a microstructure as the microstructure is extruded (e.g., an inline secondary process). Providing and/or creating sub-microstructures may occur via direct surface modification or indirectly via creation of a tool for roll-forming or embossing, or by extrusion molding, casting, spraying, etching, etc.

As used herein, the term "microstructure" may refer to geometric features, dimensions and/or distances between geometric features (e.g., periodic distances, heights and/or widths, etc.) having sizes of approximately 10-200 microns, but typically 75-125 microns. As used herein, the term "sub-microstructure" may refer to geometric features, dimensions and/or distances in which geometric features (e.g., periodic or non-periodic distances, heights and/or widths, etc.) are significantly smaller than a microstructure. In these examples, sub-microstructures may have sizes of approximately 0.1-10 microns. Some sub-microstructures, which are sometimes referred to as "nanostructures," may range in size and/or distance (e.g., a periodic distance) at approximately equal to, or less than, a wavelength of visible light, which is about 0.4-0.7 microns. Thus, the term "sub-microstructure" may also refer to dimensions less than about 0.4 microns. Therefore, for the terms "microstructure" and "sub-microstructure" as used herein, the phrase "approximately a wavelength of light" means a dimension that can range from about 0.1-10 microns.

FIG. 1 illustrates an example aircraft 100 in which the examples disclosed herein may be implemented. The aircraft 100 of the illustrated example includes a tail section 101 including a vertical fin 102 adjacent to a dorsal fairing 104, horizontal stabilizers 106, a nose section (e.g., a cockpit section) 110 and wings 112 attached to a fuselage 114. The examples described herein may be applied to surfaces and/or features (e.g., riblets) of any of the tail section 101, the nose section 110, the stabilizers 106, the wings 112 and/or the fuselage 114, or any other exterior or outboard structure (e.g., a wing strut, an engine strut, a canard stabilizer, etc.) and/or surface.

Figure 2:
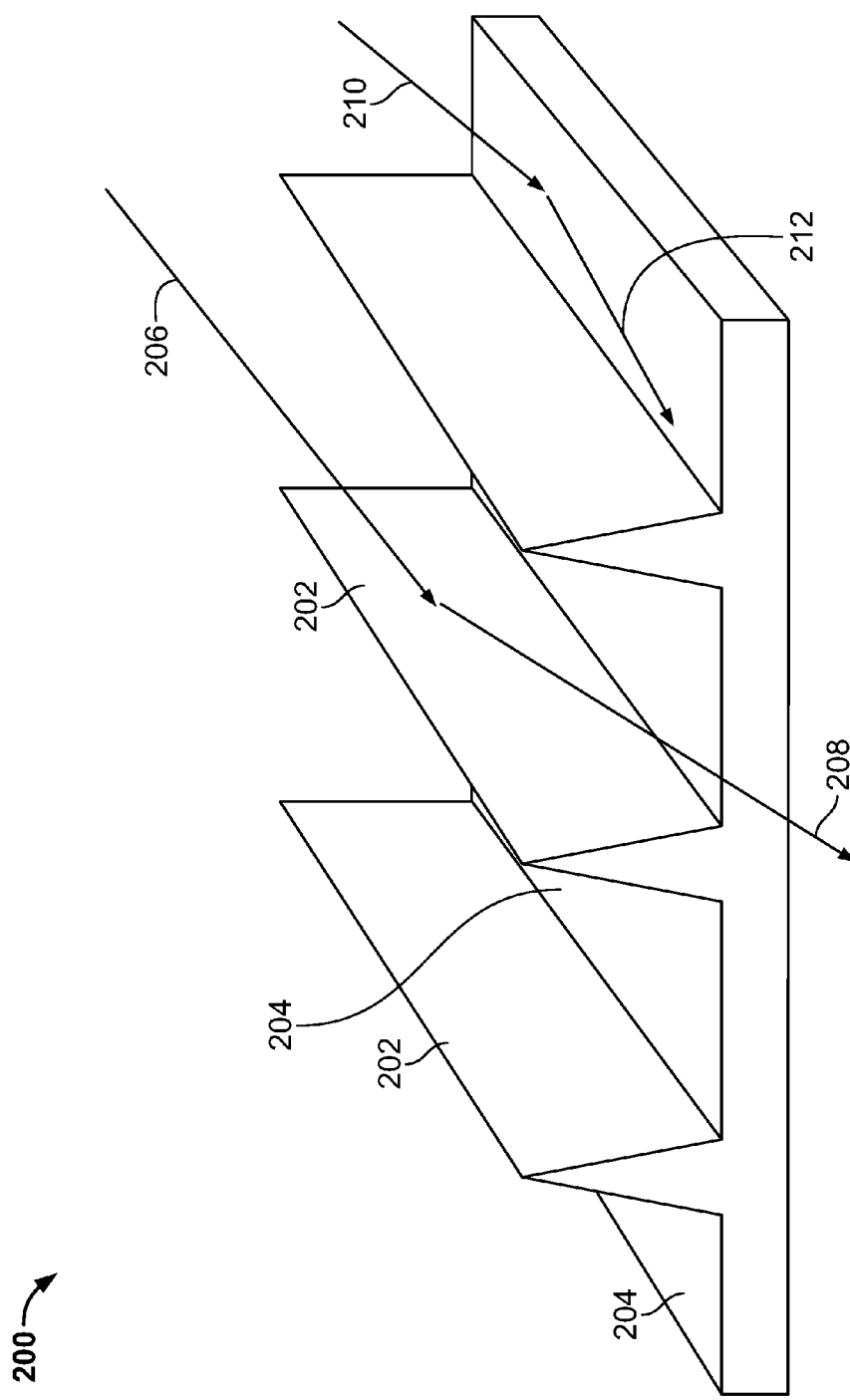
FIG. 2 is an example riblet microstructure from an external surface of the example aircraft of FIG. 1 on which the examples disclosed herein may be implemented.

FIG. 2 is an example microstructure 200 from an external surface of the example aircraft 100 of FIG. 1 on which the examples disclosed herein may be implemented. The microstructure 200 of the illustrated example includes ridges 202, which are spaced apart from one another, and base surfaces (e.g., valleys, aircraft surfaces, etc.) 204 that space the ridges 202 apart from one another. In this example, the profiles of the ridges 202 are generally triangular, thereby defining ridges having generally triangular cross-sections. A profile of the microstructure 200 is extruded to define the microstructure 200 (e.g., a defined volume of the microstructure 200). While the example microstructure 200 is extruded in this example, the example microstructure 200 may be formed by embossing, casting, pressing, thermo-forming, machining, etc. In other examples, the base surfaces 204 may have ridges that are smaller than the ridges 202 (e.g., less than a third of the height of the ridges 202) to control glint.

In this example, the microstructure 200 is a riblet of the aircraft 100 and is used to alter the aerodynamic characteristics of the aircraft 100 by reducing an overall drag of the aircraft 100, for example, and may be located on any external surface of the aircraft 100. The microstructure 200 of the illustrated example is used to reduce aerodynamic drag by controlling the turbulent boundary layers and/or preventing cross-flows associated with a turbulent boundary layer in air near an external surface of the aircraft 100. In particular, the example microstructure 200 has the ridges 202 and is installed on the external surface of the aircraft 100 and aligned with a desired direction of airflow. This alignment allows the ridges 202 to act as small fences or guides that disrupt and reduce lateral airflow motions near the external surface to enhance in-line turbulent airflow and reduce skin friction from the external surface, thereby reducing overall drag of the aircraft 100. In some examples, the microstructure 200 is not attached or installed on the external surface during or after manufacturing of the aircraft 100 but, rather, is integral with the external surface. For example, the microstructure 200 may be pre-formed into or on the external surface (e.g., machined or molded onto a skin surface, built into a composite cured part, robotically placed, etc.) instead of being coupled (e.g., mechanically adhered) to the external surface.

The overall geometry of the microstructure 200 may cause directional (e.g., forward-scattering or back-scattering) reflections, generally, and/or an optical phenomenon known as glint, which can affect the overall appearance of the aircraft 100. Glint occurs most commonly when light strikes a surface at certain angles near the surface (e.g., incident angles far from the surface normal) causing light rays to reflect onward (e.g., forward scattering) from surfaces and/or facets of the microstructure 200 toward certain viewing angles and/or positions relative to the microstructure 200 and the aircraft 100. Incident light may strike the surface from direct illumination, or from a reflection from another surface. In some examples, this reflectance may cause glint at certain viewing angles and/or positions relative to the microstructure 200 and, thus, affect the overall appearance of the aircraft 100. As seen in the view of FIG. 2, an incident light ray 206 may strike one of the ridges 202 nearly parallel to the ridge surface and, thus, a reflection 208 travels onward towards the base surfaces 204, where the reflected light ray 208 may be absorbed, transmitted, or reflected. Similarly, a ray 210, for example, may result in a reflection 212 from the base surfaces 204 towards a surface of one of the ridges 202. The reflections 208, 212 are sometimes referred to as grazing angle light reflections because they are reflections resulting from incident rays that graze (strike the surface at angles far from normal) the surface and can cause undesirable and/or an unintended appearance of the aircraft 100.

Figure 3:
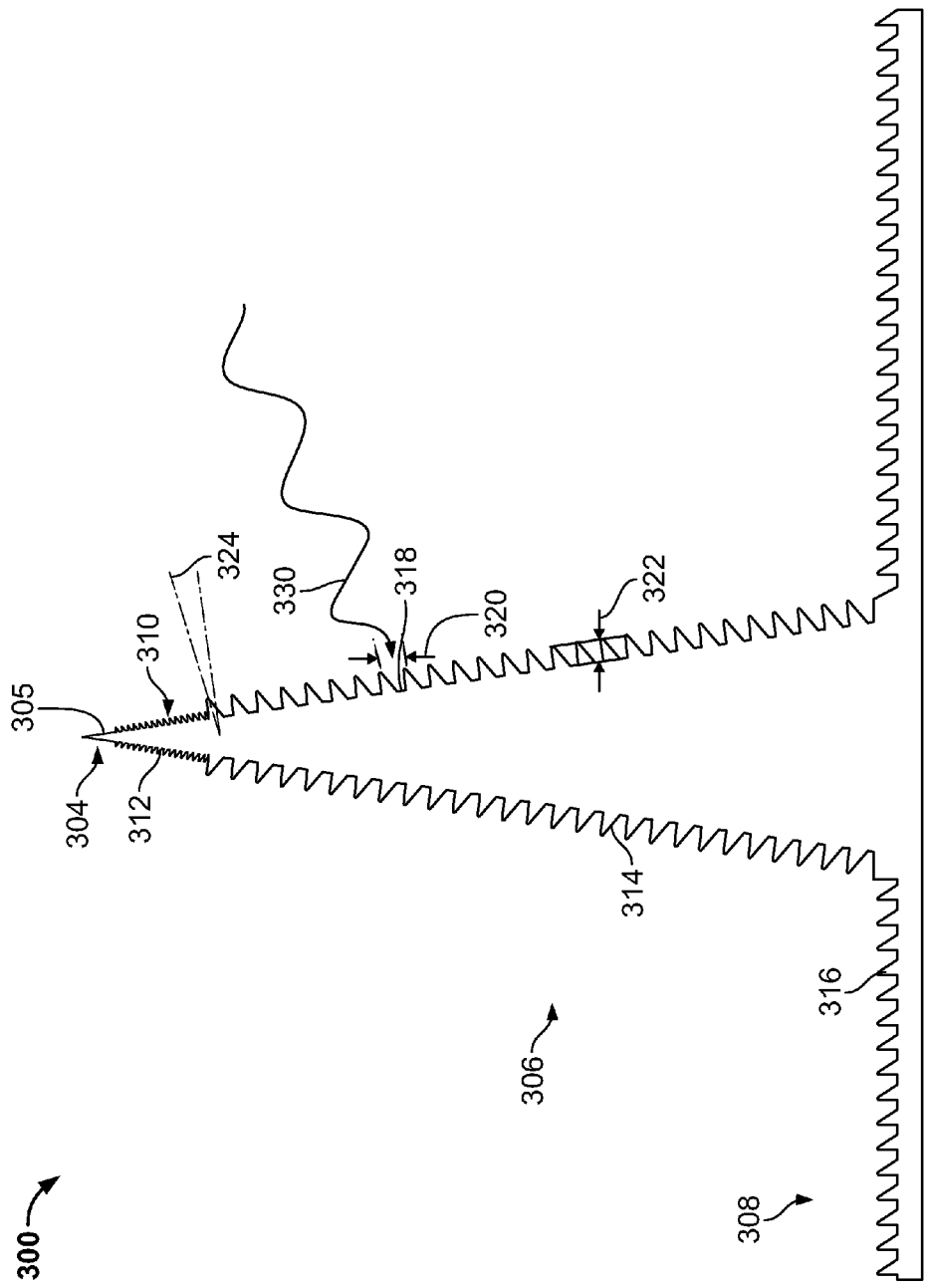
FIG. 3 is a cross-sectional view of an example microstructure with a superimposed sub-microstructure in accordance with the teachings of this disclosure.

FIG. 3 is a cross-sectional view of a microstructure (e.g., a riblet, an extruded riblet) 300 having superimposed sub-microstructures (e.g., nanoridges, sub-microstructure patterns, etc.) in accordance with the teachings of this disclosure. The microstructure 300 of the illustrated example has different portions, which include a distal portion 304 with a tip 305, an intermediate portion 306 and a base portion 308. In this example, the distal portion 304 is separated from the intermediate portion 306 by a transition portion 310, in which the sub-microstructures may transition (e.g., gradually transition) from one size to another. The transition portion 310 has sub-microstructures 312 and the intermediate portion 306 has sub-microstructures 314. Likewise, the base portion 308 of the illustrated example has sub-microstructures 316. In some examples, the tip 305 may be too small to have sub-microstructures superimposed onto the tip 305. However, in some examples, nano-scale sub-microstructures may be superimposed proximate and/or on the tip 305.

Each of the sub-microstructures 312, 314, 316 of the illustrated example has characteristic features. For example, the sub-microstructure 314 has characteristic features including base surfaces (e.g., valleys) 318, a spacing (e.g., periodic, non-periodic) 320, peak heights 322 and slope angles (e.g., an angle relative to a surface or facet of the microstructure 300) 324. In this example, a light ray 330 is shown being directed towards the intermediate portion 306. In this example, a wavelength of the light ray 330 is similar to the distance 320 and as the light ray 330 travels towards the sub-microstructures 314, a portion of the light ray 330 is transmitted to one of the base surfaces 318 and another portion of the light ray 330 is reflected from the sub-microstructures 314. As a result of the wavelength of the light ray 330 being approximately similar in size to the spacing 320, a significant portion of the light ray 330 is absorbed by the sub-microstructures 314 and, thus, the portion of the light ray 330 reflected from the sub-microstructures 314 is significantly reduced and/or eliminated, thereby reducing reflections and/or glint produced by the light ray 330. Conversely, spacing between the sub-microstructures 314 may be increased at certain portions to increase the portion of the light ray 330 that is reflected from the sub-microstructures 314. Additionally, because the sub-microstructures 314 have ridges with relatively smoothly increasing ridge width towards the base surfaces 318 (e.g., the sub-microstructures 314 are wider at their base in comparison to their respective tips) and distances on the order of a wavelength of visible light, they create a gradient index of refraction on a surface of the microstructure 300. Alternatively, the overall width varying shape of the microstructures 314 towards the base surfaces 318 facilitates light components reflecting from the microstructure 314 (e.g., Fresnel reflections).

The example sub-microstructures 312 of the distal portion 304 of the transition portion 310 have relatively smaller peak heights and spacing distances (e.g., periodic distances) in comparison to the sub-microstructures 314 and/or the sub-microstructures 316. Thus, in a manner similar to the sub-microstructures 314 described above, the sub-microstructures 312 of the illustrated example reduce and/or minimize reflections or glint resulting from incident light rays. In this example, the sub-microstructures 312 are relatively smaller and more densely packed together in comparison to the sub-microstructures 314 to retain a certain aerodynamic smoothness of the microstructure 300. In particular, larger sub-microstructures in the transition region 310 and/or near the tip 305 may cause increased drag and/or turbulence. In this example, the sub-microstructures 312 do not extend into the tip 305 to prevent durability issues, damage and/or premature structural failure of the microstructure 300. Further, in some examples, sub-microstructures located near a distal end of a microstructure or a transition region near the distal end are relatively smaller (e.g., height and/or periodic distance(s), etc.) for greater ease of manufacturability and/or based on manufacturing constraints.

In this example, the sub-microstructures 316 have peak heights and distances similar to the sub-microstructures 314. Alternatively, the peak heights and/or the distances of the sub-microstructures 316 may vary in comparison to the sub-microstructures 314 and/or the sub-microstructures 312. In some examples, the sub-microstructures 316 may differ from the sub-microstructures 314 in some locations, but have a transition gradient where the sub-microstructures 316 adjacent the sub-microstructures 314 have similar dimensional characteristics similar to those of the sub-microstructures 314, but vary further from the sub-microstructures 314. Likewise, the sub-microstructures 314 may have a transition gradient to the sub-microstructures 312 and vice-versa.

While the sub-microstructures 312, 314, 316 are shown protruding generally perpendicular to surfaces of the microstructure 300 in some locations, any of the sub-microstructures 312, 314, 316 may be angled and/or shaped relative to the respective surfaces of the microstructure 300 (e.g., they may be slanted) from which they extend. In some examples, such angling of the sub-microstructures 312, 314, 316 increases ease of manufacturability (e.g., tool removal in machining, casting or molding processes, etc.) of the sub-microstructures 312, 314, 316. Further, angling the sub-microstructures 312, 314, 316 relative to the surfaces of the microstructure 300 may allow for different visual effects and/or reflection angles for light rays incident on the microstructure 300. In some examples, such angling and/or shaping may also allow reflections to be viewed at only certain angles (e.g., viewing angles) relative to the microstructure 300.

While the example sub-microstructures 312, 314, 316 are also shown in FIG. 3 as having substantially regular patterns (e.g., distances between individual sub-microstructures are relatively similar) and/or relatively uniform heights among individual sub-microstructures, characteristics of the sub-microstructures 312, 314, 316 may vary over portions of the microstructure 300. In particular, any of the sub-microstructures 312, 314, 316 may define patterns based on variation within or between the sub-microstructures 312, 314, 316. For example, to define a pattern, the distance (e.g., the periodic distance) 320 of the sub-microstructures 314 may vary from the base portion 308 to the tip 305 (e.g., lengthening or shortening of the distance 320 and/or lengthening or shortening of the peak heights 322). Additionally or alternatively, the overall shape, geometry and/or structure(s) of superimposed sub-microstructures may vary over different portions of the microstructure 300 (e.g., ridge-shaped sub-microstructures in one portion and cone-shaped sub-microstructures in another portion of a microstructure) to define a pattern (e.g., a superimposed pattern). Variation of sub-microstructures superimposed on a microstructure along with relatively flat portions adjacent or near the sub-microstructures, in some examples, may be used to define patterns that allow for visual and/or aesthetic effects. As a result, images and/or indicia may be conveyed through a pattern of sub-microstructures (e.g., a pattern of superimposed sub-microstructures) in which the sub-microstructures vary between different microstructures and/or portions of a microstructure. For example, different sub-microstructure groups, each group having different heights, spacing and/or orientation may be used to show/convey a specifically defined aesthetic look or an image. Alternatively, a pattern of sub-microstructures along with relatively flat surfaces may be used to convey the images and/or the indicia. Additionally or alternatively, any of the sub-microstructures 312, 314, 316 may have randomly distributed peak heights and/or spaces between individual sub-microstructures.

While the microstructure 300 of the illustrated example is ridge-shaped, the microstructure 300 may be any appropriate shape or geometry, including any of the shapes and/or any combination of the shapes described below in connection with FIGS. 5A-5F. Similarly, while the sub-microstructures 312, 314, 316 are shown as having a substantially triangular ridge shaped profile or cross-section in FIG. 3, they may be any appropriate shape including any of the shapes and/or any combination of the shapes or geometries associated with FIGS. 5A-5F shown below.

In some examples, coatings may be applied to the microstructure 300 and/or any of the sub-microstructures 312, 314, 316. For example, the microstructure 300 and/or the sub-microstructures 312, 314, 316 may be coated with an anti-reflective coating, a reflective coating and/or colored coatings (e.g., paints, inks or dye infusion) in their entirety and/or partially coated on a single side or facet to control the reflection of light in a pre-defined direction and/or viewing angle(s) and, thus, define an appearance of the microstructure 300. In some examples, coatings are only applied to portions of the microstructure 300 (e.g., the base portion 308, the intermediate portion 306 and/or the distal portion 304) and/or portions of the sub-microstructures 312, 314, 316 (e.g., upwardly facing surfaces of the sub-microstructures 314, etc.).

Figure 4:
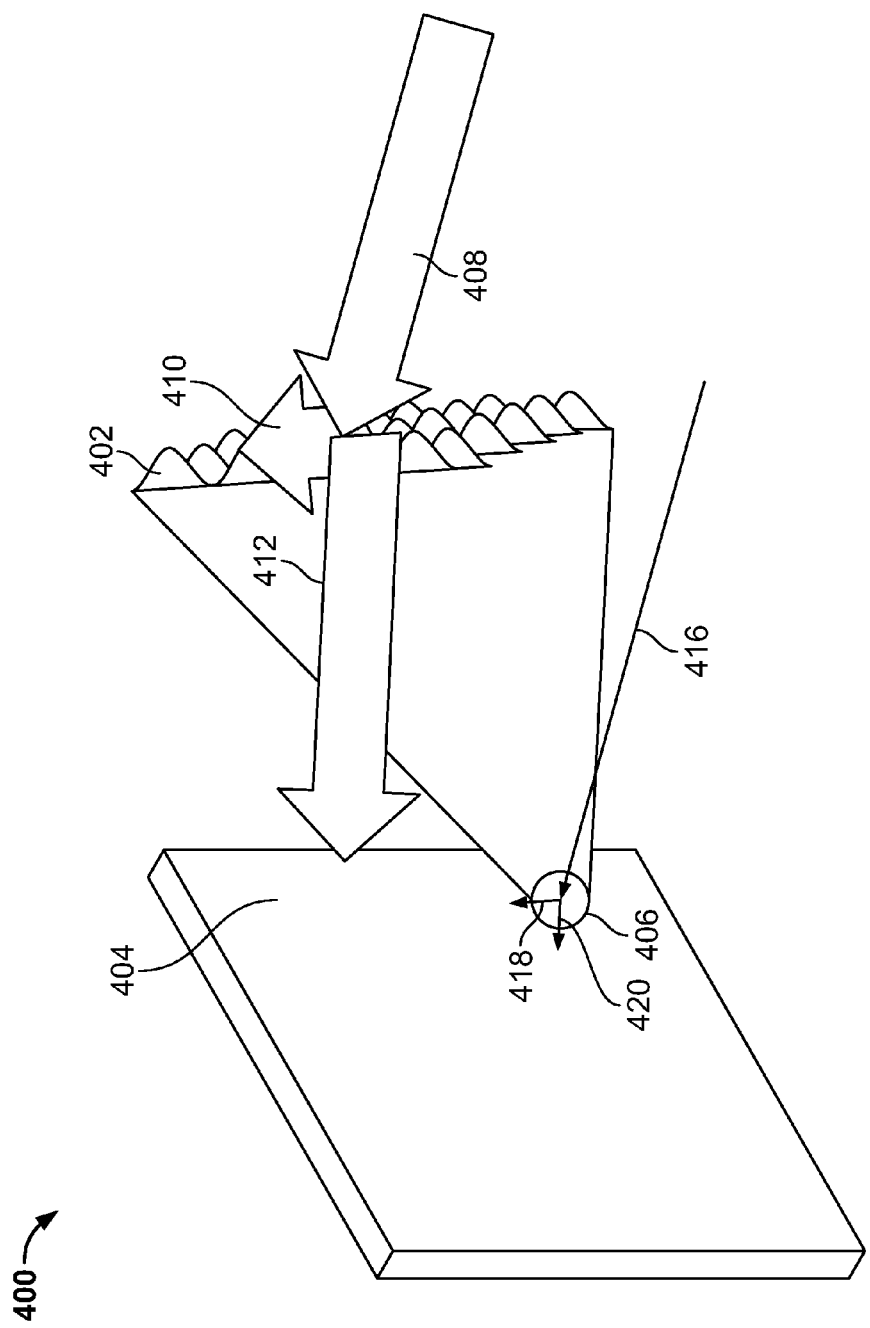
FIG. 4 illustrates an example surface section of another example microstructure with a superimposed sub-microstructure that may be smaller than the wavelength of light.

FIG. 4 illustrates an example microstructure 400 with superimposed sub-microstructures (e.g., nanostructures) 402 on a surface 404. In this example, the microstructure 400 and the superimposed sub-microstructures 402 are both polymer and, thus, define an air-polymer interface 406 for incident light rays. In contrast to the sub-microstructures 312, 314, 316 described above in connection with FIG. 3, the sub-microstructures 402 of the illustrated example have rounded cone-like protrusions sometimes referred to as a motheye geometry. The example microstructures 402, which extend generally perpendicular to the surface 404, have associated characteristic dimensions (e.g., are separated by distances, have corresponding pitch distances, etc.) similar to or on the order of the wavelength of incident light (e.g., less than the wavelength of light) and/or aspect ratios defined between distances and heights of sub-microstructures superimposed on a microstructure.

In this example, an arrow 408 represents a general direction of an incident light ray directed towards the sub-microstructures 402. As a result of being directed towards the sub-microstructures 402, the example incident light ray is divided into a smaller reflected portion represented by an arrow 410, and a larger transmitted and/or absorbed portion, which is coupled into the material, based on the material properties and is represented by an arrow 412. The arrows 408, 410, 412 of the illustrated example are also represented by arrows 416, 418, 420, respectively, which are shown relative to the surface 404. In this example, the arrow 418 is reflected and the arrow 420 is transmitted and refracted. However, the sub-microstructures 402 of the illustrated example significantly reduce the intensity of Fresnel reflection(s) by creating a gradual change in refractive index from air to a material of the microstructure 400 and, thus, may affect the appearance of the surface 404. In particular, varying the sub-microstructures 402 (e.g., heights, spacing, orientation and/or shapes of the sub-microstructures 402) at different locations (e.g., defining sub-microstructure groups where the groups have different sub-microstructure characteristics) may allow an image to be conveyed, for example.

FIGS. 5A-5G illustrate examples of geometries (e.g., shapes) that may be used for microstructures as well as sub-microstructures (e.g., nanostructures) that may be superimposed onto microstructures. The example shapes of FIGS. 5A-5G may also be utilized as any combination of these shapes and/or any other appropriate shape for both microstructures and sub-microstructures. In particular, the shapes shown in FIGS. 5A-5G may be superimposed onto one another (e.g., as sub-microstructures superimposed onto a microstructure, etc.). For example, an example protrusion 540 of FIG. 5E may be superimposed as a sub-microstructure onto an example protrusion 562 or the gap 564 of FIG. 5G and vice-versa. In some examples, different shapes such as the shapes of FIGS. 5A-5G are used in combination to convey an image and/or indicia.

Figures 5A, 5B, 5C, 5D, 5E, 5F, 5G:
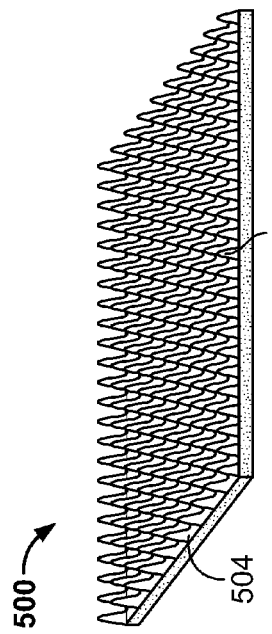
FIGS. 5A-5G illustrate example shapes that may be used to implement microstructures as well as sub-microstructures that may be superimposed on microstructures.

FIG. 5A depicts an example protrusion (e.g., a bump, a protrusion from a base surface, etc.) shape 500 that may be used to implement the example microstructures and/or sub-microstructures described herein. The example protrusion shape 500 also has a corresponding bump profile (e.g., a cross-sectional shape) 504, which may vary along multiple directions, and which may be sinusoidal, parabolic, triangular, or any other appropriate geometry. In example microstructures with a parabolic-shaped profile, sub-microstructures may be superimposed onto the parabolic-shaped microstructure closer to the tip of the microstructure as opposed to a triangular-shaped microstructure. In some examples, sub-microstructures placed near a tip of the triangular-shaped microstructure may cause structural weakness and/or may not be possible due to manufacturing constraints (e.g., a tool may not pull away from the triangular-shaped microstructure without damaging the sub-microstructures near the tip).

FIG. 5B depicts example geometries, which are shown as individual shapes and may be applied to microstructures or sub-microstructures. The example geometries include a triangular shape 510, a cylindrical shape 512, a rectangular shape 514, and a sinusoidal and/or parabolic shape 516. The triangular shape 510 may be a cone, a pyramidal shape or a triangular ridge, for example. In general, the example geometries of FIG. 5B may be shape profiles with corresponding depths (e.g., a two-dimensional shape with a defined depth to be extended or extruded) or a three-dimensional shape such as a cone. For example, the parabolic shape 516 may be extruded/extended as a cross-section or may be revolved around an axis to have a three-dimensional parabolic shape.

FIG. 5C depicts an example geometry 520 with varying heights, which may be applied to microstructures or sub-microstructures. The geometry 520 of the illustrated example includes peaks 522 and sub-peaks 524, which may be arranged in a relatively regular pattern (e.g., an alternating pattern) or may not be arranged in a regular pattern (e.g., a random distribution). Alternatively, a predefined number of sub-peaks 524 may be located in spans between the peaks 522 (e.g., three sub-peaks 524 between the peaks 522 in one or more directions, etc.). In any of these examples, the arrangement of the peaks 522 and the sub-peaks 524 relative to one another may allow different optical effects to convey an image, and/or glint reduction. In some examples, the sub-peaks 524 may be microstructures or sub-microstructures.

FIG. 5D depicts a two-dimensional or three-dimensional example slant geometry 530 that may allow for improved and/or desired optical effects and/or greater manufacturing ease via a simplified tool release, for example. The slant geometry 530 of the illustrated example may be implemented as a microstructure or a sub-microstructure. For example, a sub-microstructure with a slant geometry may be superimposed onto a microstructure having a slant geometry.

FIG. 5E depicts three-dimensional protrusions 540 with a pattern that extends (e.g., protrudes) from a surface. In this example, the protrusions 540 have a cone-like shape. The protrusions 540 of the illustrated example may have rectangular facets and/or be cones having circular cross-sections. While the illustrated example of FIG. 5E shows cone-like shapes, any appropriate shape may be used including those described in the examples disclosed herein. In some examples, three-dimensional parabolic functions (e.g., revolved parabolic functions) may be used to define three-dimensional protrusions.

FIG. 5F depicts three-dimensional indentations 550 on a surface. The example indentations 550 may be any appropriate shape, including those described herein. For example, the indentations may be oval-like or circular indentations (e.g., bump indentations), holes, ridges and/or grooves, etc. In some examples, a combination of the three-dimensional indentations 550 and cone-like protrusions such as the cone-like geometry 540 of FIG. 5E may be used to define a shape of a microstructure or a sub-microstructure with unique optical characteristics.

FIG. 5G depicts a pattern 560 in which protrusions (e.g., triangular ridges) 562 are separated by gaps (e.g., planar gaps) 564, which is similar to the microstructure 200 of FIG. 2. In this example, the protrusions 562 are spaced at substantially similar or equal distances to one another. However, in other examples, the spacings between the protrusions 562 may vary (e.g., may be irregular) to improve manufacturability (e.g., tool separation) and/or for certain desired optical effects. In some examples, the gaps 564 are curved, have multiple segments and/or are contoured.

Figure 6:
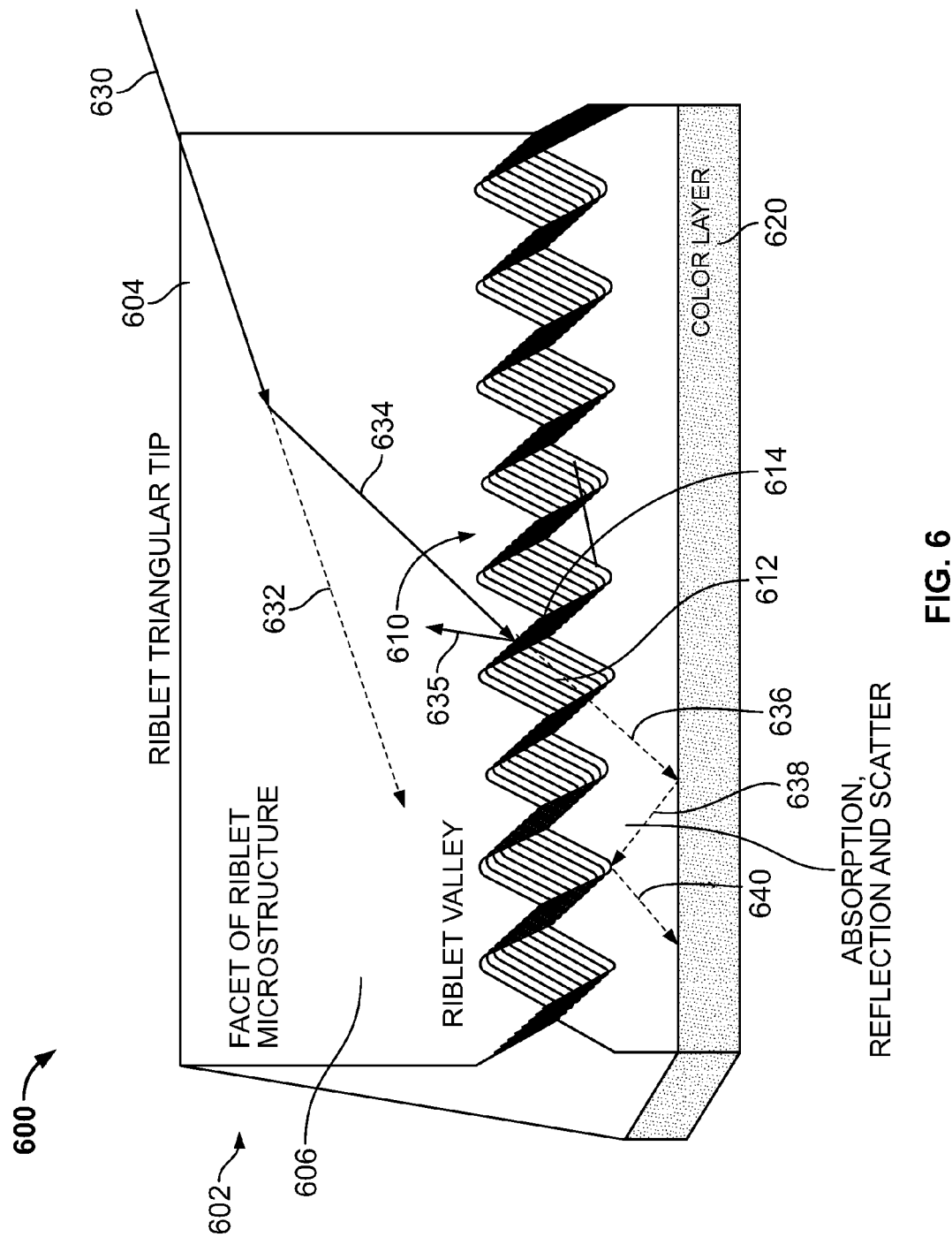
FIG. 6 is a view of another example microstructure with sub-microstructures superimposed on a base surface of the example microstructure.

FIG. 6 is a view of another example microstructure 600, which is a riblet in this example. The example microstructure 600 includes a microstructure ridge (e.g., a riblet ridge) 602 with a generally triangular-shaped tip 604 and a surface (e.g., a facet) 606 of the ridge 602. The example microstructure 600 includes sub-microstructure ridges 610 that extend across a base of the microstructure 600 between (e.g., span between) the riblet ridge 602 and another adjacent riblet ridge. In this example, the sub-microstructure ridges 610 are sub-microstructures provided on the base of the microstructure 600 and also include ridge surfaces (e.g., facets) 612, 614 adjacent to one another and defining peaks of the ridges 610. In some examples, the ridge surfaces 612, 614 are at different slope angles from a vertical line relative to one another (e.g., the ridge surfaces 612, 614 are at different angles relative to a vertical line in the view shown in FIG. 6). The microstructure 600 and the sub-microstructure ridges 610 of the illustrated example are adjacent a color layer 620.

In this example, the riblet ridge 602 and the sub-microstructure ridges 610 extend in generally perpendicular directions relative to one another. In other examples, the example sub-microstructure ridges 610 may be substantially parallel or at an angle relative to the riblet ridge 602. In some examples, a surface, which spans between the ridge 602 and the adjacent ridge, has contours that may be relatively flat, curved and/or angled between the riblet ridge 602 and the adjacent riblet edge and, thus, the sub-microstructure ridges 610 may follow such contours. In some examples, the sub-microstructure ridges 610 are oriented at different angles relative to the riblet ridge 602 for different optical effects including glint reduction effects (e.g., glint reduction for a specific range of viewing angles relative to the example microstructure 600, etc.), to convey an image or indicia, and/or may be manufactured from material that is colored (e.g., previously colored) or color infused.

The microstructure 600 of the illustrated example is mechanically coupled and/or attached to the color layer 620. In some examples, the color layer 620 is integral with the microstructure 600. In some examples, the color layer 620 may be a portion of the microstructure that is colored (e.g., coated, etc.) and/or added to the microstructure 600 during a secondary process (e.g., a layering process, etc.).

In the illustrated example of FIG. 6, the microstructure 600 is semi-translucent, fully translucent or transparent. In particular, the example microstructure ridge 602 and the sub-microstructure ridges 610 may allow at least a portion of light to travel therethrough, while reflecting another portion of the light based on the refractive light index of the mediums, and incident angles at the interfaces, through which the light travels. In this example, an incident light ray 630 is directed towards the surface 606 of the microstructure ridge 602. The incident light ray 630 of the illustrated example has a resulting transmitted component 632 that is absorbed in and/or travels through the ridge 602. The incident light ray also has a reflected component 634 that is directed towards the sub-microstructure ridges 610. In some examples, the incident ray 630 is at least partially absorbed in the microstructure ridge 602 via sub-microstructures (e.g., the sub-microstructures 312, 314, 316, 402) superimposed onto the surface 606. Varying a degree to which rays are absorbed at different locations may allow a representation of an image to be conveyed to an observer.

The reflected component 634 of the illustrated example is an incident ray onto the sub-microstructure ridges 610. The incident ray 634, strikes the sub-microstructure facet 614, thereby creating another reflected ray 635 that is directed back to the microstructure surface 606, where it may be scattered, transmitted therethrough and/or absorbed, thereby affecting an appearance of the example microstructure 600. Additionally, a resulting transmitted component 636 is coupled into the microstructure base layer and directed towards the color layer 620, in which a reflection portion 638 may then be reflected towards the surfaces 612, 614, and another portion 640 may be absorbed or scattered within the base of the microstructure 600. Such absorbing and/or scattering may further affect the appearance of the example microstructure 600 by re-directing the portion 640 into multiple directions. In some examples, directing reflected portions towards other sub-microstructures (e.g., sub-microstructures on the surface 606) may also further affect the appearance (e.g., routing reflected light components towards sub-microstructures).

As mentioned above, in some examples, sub-microstructures on the surface 606, for example, may be controlled to vary the amount of light reflected towards the sub-microstructure ridges 610 at different positions of the sub-microstructure ridges 610. In some examples, the ridges 610 and/or the surfaces 612, 614 have sub-microstructures superimposed thereon. In some examples, the ridges 610 and/or the surfaces 612, 614 have multiple groups of different sub-microstructures to affect the appearance of the microstructure 600 and/or convey an image and/or indicia to an observer.

Additionally or alternatively, either of the surfaces 612, 614 may be a reflective (e.g., mirrored) surface and/or have reflective portions to control the magnitude and direction of the reflected light to further control the aesthetics and/or provide further capabilities to convey an image. While the ridges 610 are sub-microstructures in this example, they may be microstructures (e.g., dimensions having larger than sub-microstructures as described herein), but still are relatively smaller in comparison to the microstructure 600. It has been determined that relatively smaller secondary microstructures placed between (e.g., at base surfaces between) primary microstructures and approximately a third of the size and/or spacing of the primary microstructures may also control and/or reduce glint to affect the overall look of the microstructure 600. Thus, the sub-microstructure ridges 610, in some examples, may instead be microstructures, which may or may not have sub-microstructures superimposed thereon. Such microstructures may have dimensions (e.g., heights, heights below or above a base surface) such as a height approximately a third of a height or width of the microstructure ridge 602 (or smaller) to effectively control glint or alter the overall appearance of the microstructure 600.

Figure 7:
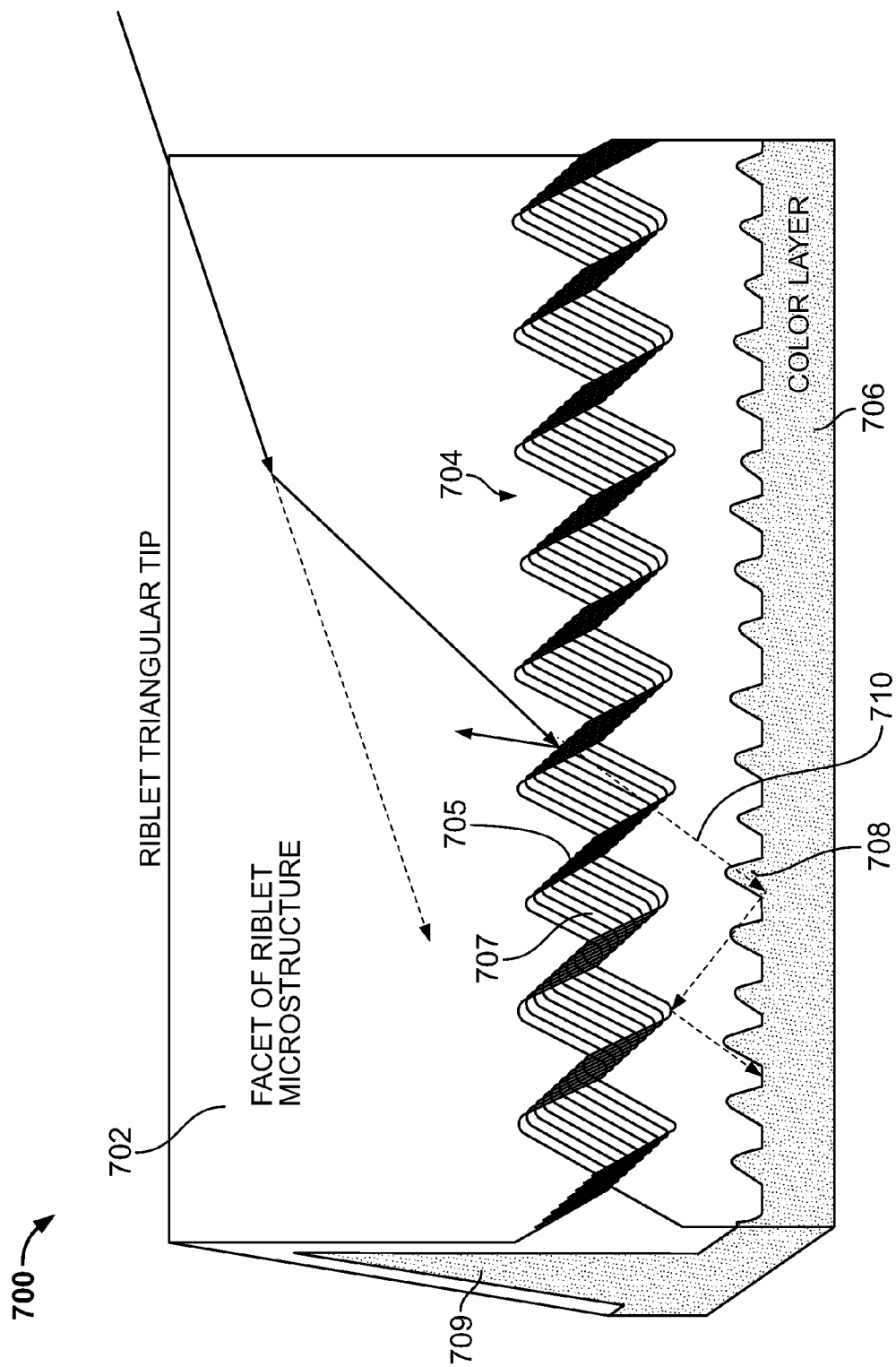
FIG. 7 is a view of another example microstructure with sub-microstructures superimposed on a base surface of the example microstructure and having additional sub-microstructures at an interface.

FIG. 7 is a view of another example microstructure 700 with a ridge 702 and ridges 704 that includes surfaces 705, 707. The microstructure 700 of the illustrated example is similar to the example microstructure 600 of FIG. 6, but instead has a textured color layer 706 with sub-microstructures 708 that define a textured interface between the color layer 706 and the rest of the microstructure 700 instead of a relatively flat interface, as shown in the example microstructure 600 of FIG. 6. In some examples, the color layer 706 has a portion (e.g., an extension, a protrusion, etc.) 709 that extends and/or partially extends into the riblet tip 702. In this example, a transmitted ray 710 is reflected from a surface of the ridge 702 and then transmitted through the sub-microstructure surface 705 into the base layer may be absorbed and/or scattered by the sub-microstructures 708, for example. In particular, the sub-microstructures 708 may be spaced apart at distances similar to the wavelength of visible light. In this example, the portion 709 of the color layer 706 that extends into the ridge 702 may affect the amount of light scattered and/or absorbed, or affect a manner in which the color layer 706 appears to a viewer. Additionally or alternatively, in a similar manner, the color layer 706 may extend into the ridges 704 (e.g., at least partially match the contours of the ridges 704), for example. In some examples, the color layer 706 has a textured interface at an interface in which the color layer 706 extends into the riblet tip 702 and/or the ridges 704. The textured interface may also affect how light is reflected from the color layer 706, thereby affecting an appearance of the microstructure 700 to an observer.

In some examples, the sub-microstructures 708 and/or a roughness associated with the sub-microstructures 708 is used to enhance coupling to the microstructure base color layer 706 and/or a degree to which light is reflected from the color layer 706. In particular, the sub-microstructures 708 enhance optical and mechanical coupling to the microstructure 700 by increasing contact surface area between the color layer 706 and the microstructure 700. In some examples, the surfaces 705, 707 may be reflective (e.g., mirrored). Additionally or alternatively, only the surfaces 705 may be reflective while the surfaces 707 may be at least semi-translucent (e.g., translucent, transparent, etc.) and vice-versa. Making only a portion of the surfaces reflective allows control of reflectivity and/or light absorption from different viewing angles and may be used to convey an image or indicia. In some examples, the sub-microstructures 708 may not be sub-microstructures and may instead be larger textured features on the order of microstructure dimensions. Additionally or alternatively, the sub-microstructures 708 may diffract light into specific colors and/or angles to create desirable optical and/or aesthetic effects (e.g., to convey images) including dispersing light spectrally (e.g., spread out into multiple colors to create a rainbow-type effect).

Figure 8A:
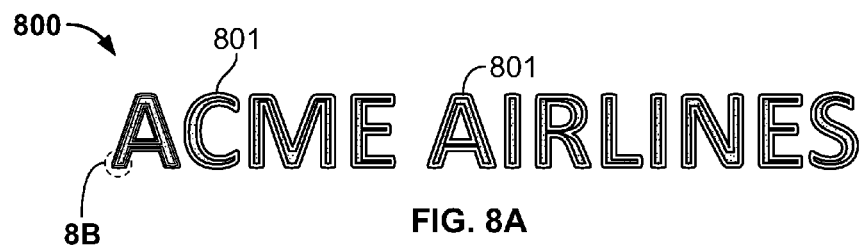
FIG. 8A illustrates example indicia that are formed by sub-microstructures in accordance with the teachings of this disclosure.

FIG. 8A illustrates example indicia (e.g., a logo, letters, symbols, etc.) 800 formed by groups of sub-microstructures, in accordance with the teachings of this disclosure. In this example, the indicia 800 and corresponding lettering 801 are formed by a pattern defined by a combination of different sub-microstructure groups and/or relatively flat areas of a vehicle surface. In some examples, images may be projected onto microstructures by superimposing different sub-microstructures (e.g., nanostructures) across surface(s) of the microstructures, or at other visible interfaces beneath surfaces of the microstructures. In some examples, a single sub-microstructure group (e.g., a particular size and/or shape of sub-microstructures) is used in combination with relatively flat areas to convey a representation of an image and/or indicia.

Figure 8B:
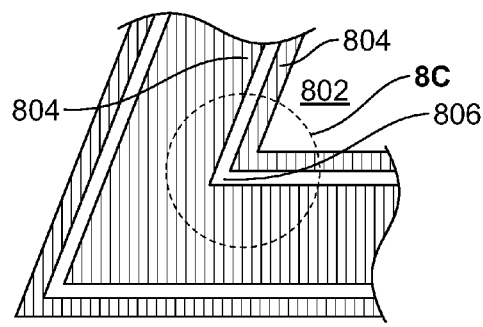
FIG. 8B is a detailed view of the example indicia of FIG. 8A.

FIG. 8B is a detailed view of the example indicia 800 of FIG. 8A. In the view of FIG. 8B, the indicia 800 includes a relatively flat portion 802, a first sub-microstructure portion 804 and a second sub-microstructure portion 806. In this example, the combination of the first and second sub-microstructure portions 804, 806 creates a visually perceptible image to an observer. This image is perceived because of the different reflective properties between the first and second sub-microstructure portions 804,806. In particular, the different reflective properties result from differences in alignment (e.g., ridge alignment) and/or spacing between the sub-microstructure portions 804, 806. While a logo is shown in this example, the examples disclosed herein may be used to create relatively complex images (e.g., graphics, photos, etc.), a diffractive effect, and/or a holographic effect. In some examples, the relatively flat portion 802 is used to enhance the visual effect created by the sub-microstructure portions 804, 806 by providing a contrasting feature or colors, and/or enhancing a perceived depth of the image conveyed by the observer. Alternatively, in some examples, an image may be conveyed primarily by a difference in spacing, height, shape and/or orientation between different sub-microstructure groups.

Figure 8C:
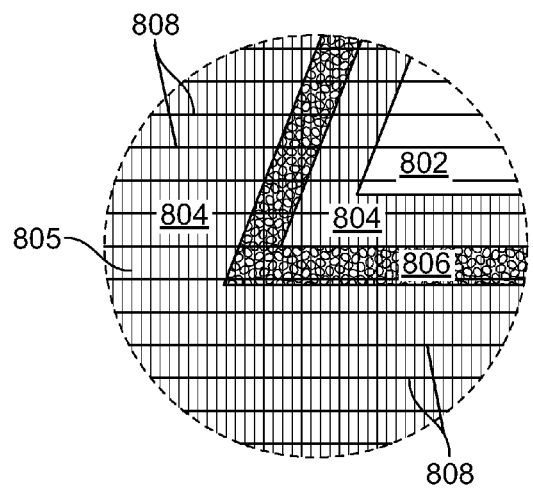
FIG. 8C is a detailed view of a portion of the view of FIG. 8B.

FIG. 8C is a detailed view of a portion of the view of FIG. 8B. In this example, the sub-microstructure portion 804 is defined and/or partially defined by ridges (e.g., sub-microstructure ridges) 805 that extend throughout the sub-microstructure portion 804. As can be seen in the view of FIG. 8C, microstructure ridges 808 extend across the sub-microstructure portions 804, 806 and the relatively flat portion 802 and, thus, the microstructure ridges 808 of the illustrated example are not interrupted as the ridges 808 extend through the sub-microstructure portions 804, 806 and/or the relatively flat portion 802. In this example, the microstructure ridges 808 project above the surfaces patterned with sub-microstructure portions 804, 806, the ridges 805 and relatively flat regions (e.g., regions without patterns) 802.

Figure 8D:
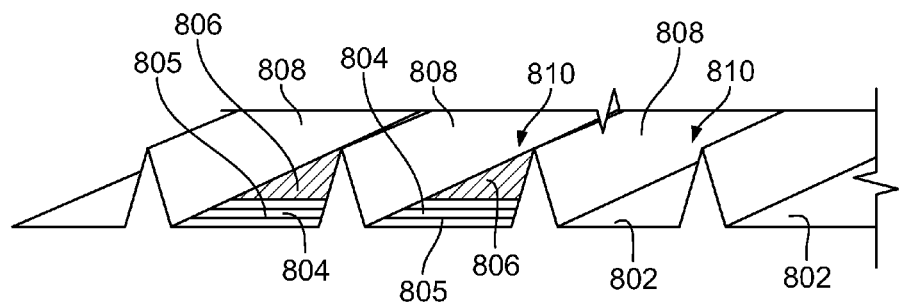
FIG. 8D is a detailed isometric view of the example indicia of FIGS. 8A-8C.

FIG. 8D is an isometric detailed view of the example indicia 800 of FIGS. 8A-8C. As can be seen in the view of FIG. 8D, base portions (e.g., base surfaces) 810 are located between the microstructure ridges 808. In this example, the sub-microstructure portions 804, 806 and the relatively flat portion 802 are superimposed on the base portions 810 and not on the ridges 808. Thus, in this example, sub-microstructures of the sub-microstructure portions 804, 806 do not extend onto the ridges 808. Additionally or alternatively, sub-microstructures may superimposed onto the ridges 808 to achieve an optical effect (e.g., convey an image or indicia, a diffractive effect) and/or to reduce glint, for example. In some examples, a combination of sub-microstructures superimposed on base portions as well as microstructure (e.g., microstructure ridges) is used to convey a representation of an image or indicia.

Figure 9:
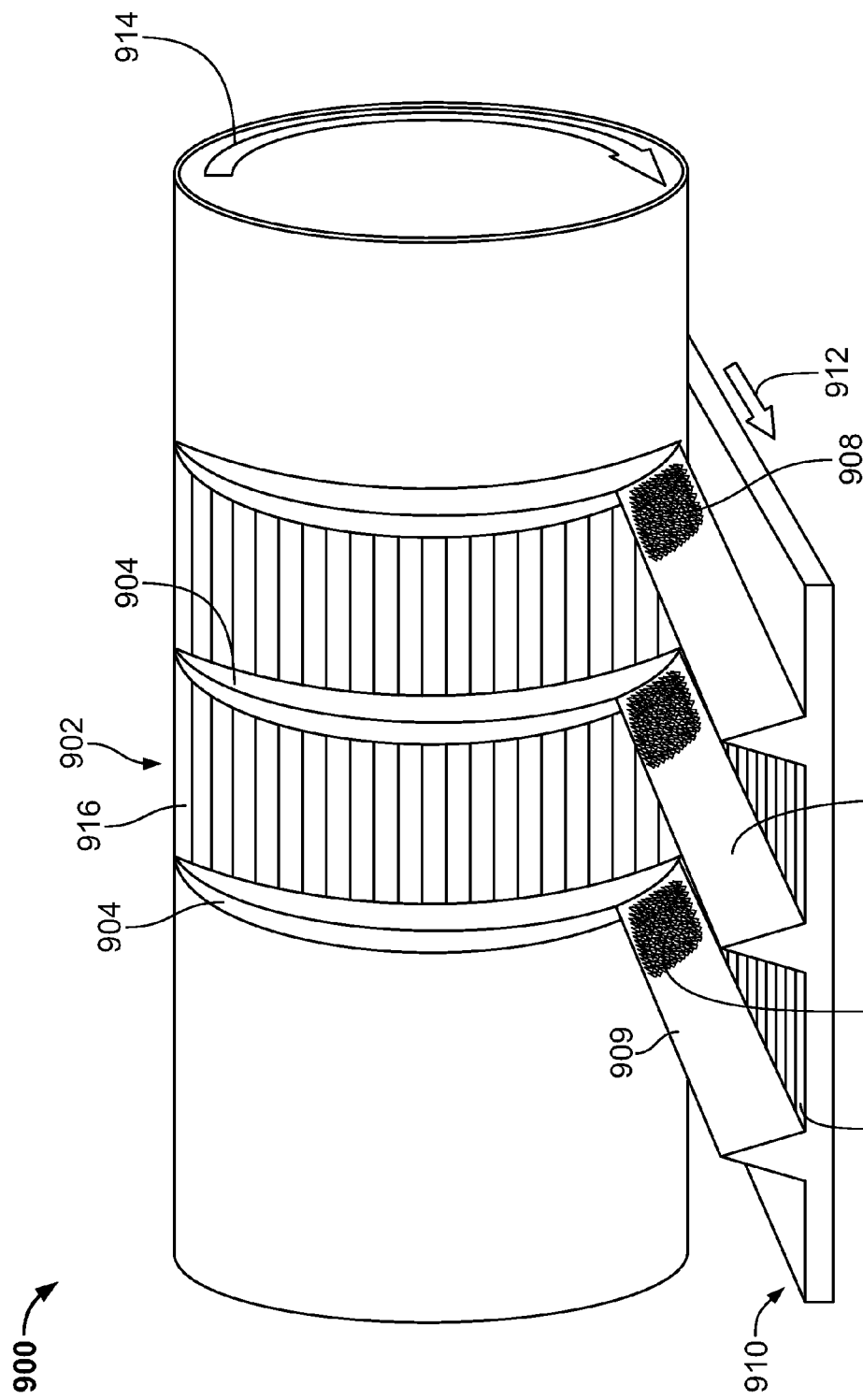
FIG. 9 illustrates an example roll-forming system that may be used to implement the examples disclosed herein.

FIG. 9 illustrates an example forming system 900, which uses roll-forming, that may be used to implement the examples disclosed herein. The example roll-forming system 900 includes a roller 902 with sub-microstructure forming grooves 904. In the illustrated example of FIG. 9, the roll-forming system 900 is being used to form (e.g., emboss) sub-microstructures (e.g., motheye sub-microstructures, sub-microstructure ridges, etc.) 908 onto ridges 909 of a microstructure (e.g., a riblet) 910. In this example, the roll forming system 900 may be used to form multiple sub-microstructure groups onto the microstructure 910 as shown above in connection with the example indicia 800 of FIG. 8.

During operation of the roll-forming system 900, the microstructure 910 moves in a direction generally indicated by an arrow 912 while the roller 902 rotates in a direction generally indicated by an arrow 914. In this example, motheye forming structures to form the sub-microstructures 908 on the ridges 909 are within the grooves 904 (e.g., tooling shapes and/or geometry used to form the sub-microstructures 908), which also have complementary indentations to receive the ridges 909. The motheye forming structures in the grooves 904 may vary in size to form smaller sub-microstructures near the tip of the microstructure ridges 909 while forming larger sub-microstructures elsewhere on the microstructure ridges 909, for example (see FIG. 3). In some examples, a force applied to the microstructure 910 via the roller 902 is adjusted to alter a degree to which the sub-microstructures 908 are formed onto the microstructure 910. Additionally or alternatively, a line speed at which the microstructure 910 moves relative to the machining system 900 and/or a rotational speed of the roller 902 is adjusted to control the process of forming the sub-microstructures 908 on the microstructure 910 and/or a degree to which the sub-microstructures 908 are formed on the microstructure 910. In some examples, the roller surface 902 may have structures 916 to form (e.g. emboss) sub-microstructures (e.g., ridges) into microstructure base areas 918 between the microstructure ridges 909.

Figure 10:
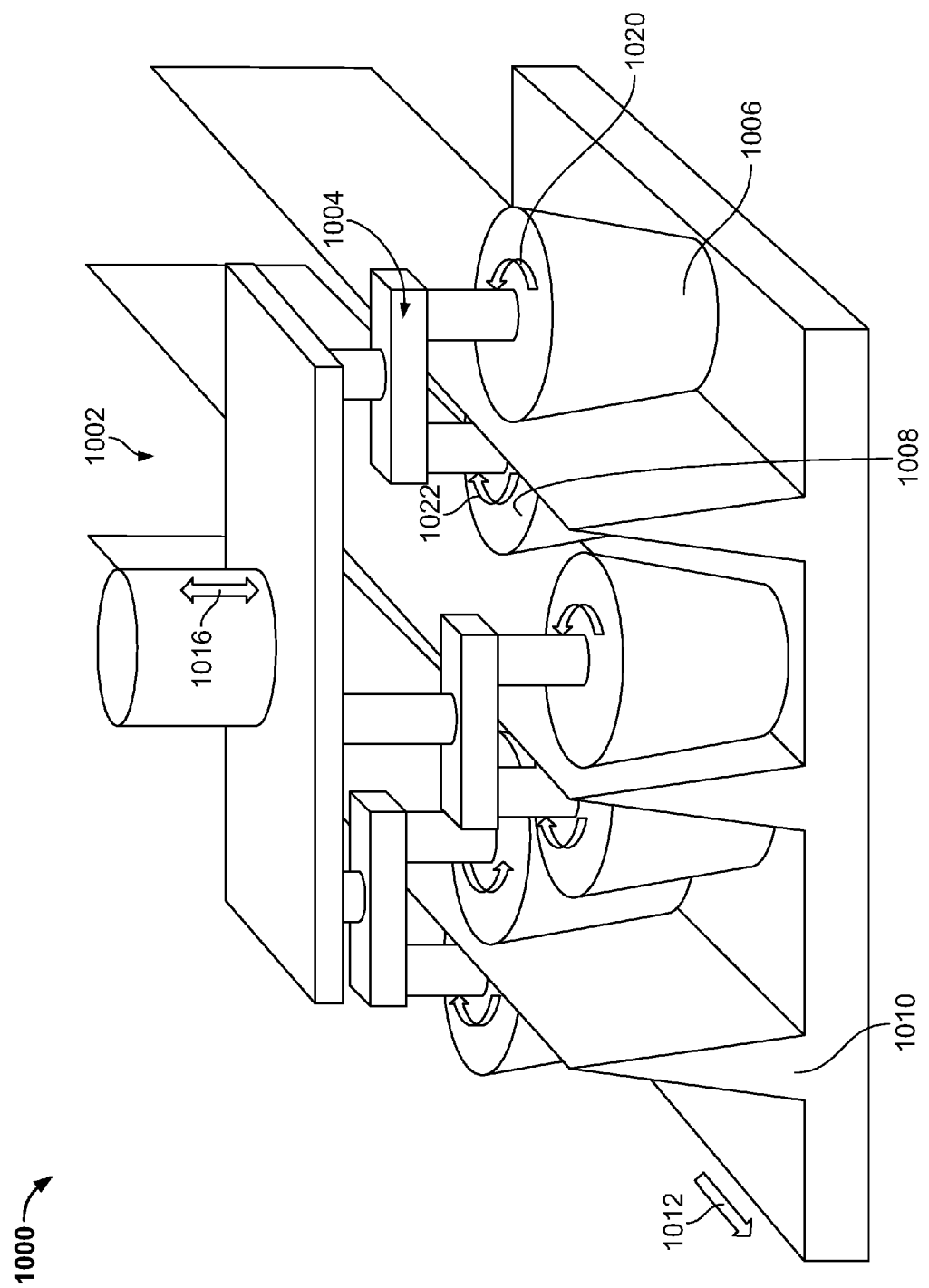
FIG. 10 illustrates an example embossing system that may be used to implement the examples disclosed herein.

FIG. 10 illustrates an example forming system 1000 that may also be used to implement the examples disclosed herein. The example forming system 1000 includes an embossing rig 1002 on which alignment fixtures 1004 are mounted. The fixtures 1004 each have forming rollers (e.g., tapered embossing rollers) 1006, 1008 to form (e.g., emboss) sub-microstructures onto a microstructure 1010.

In operation, the forming system (e.g., a secondary process system) 1000 of the illustrated example forms the sub-microstructures onto the microstructure 1010 as the microstructure 1010 is extruded in a direction generally indicated by an arrow 1012. In this example, the microstructure 1010 is a riblet (e.g., a riblet substrate) that is extruded. During operation of the embossing rig 1002, the embossing rig 1002 may move in an upward or downward direction generally indicated by a double arrow 1016. To form and/or add the sub-microstructures and/or sub-microstructure groups onto the microstructure 1010, the rollers 1006, 1008 of the illustrated example rotate in direction generally indicated by arrows 1020, 1022, respectively.

Figure 11:
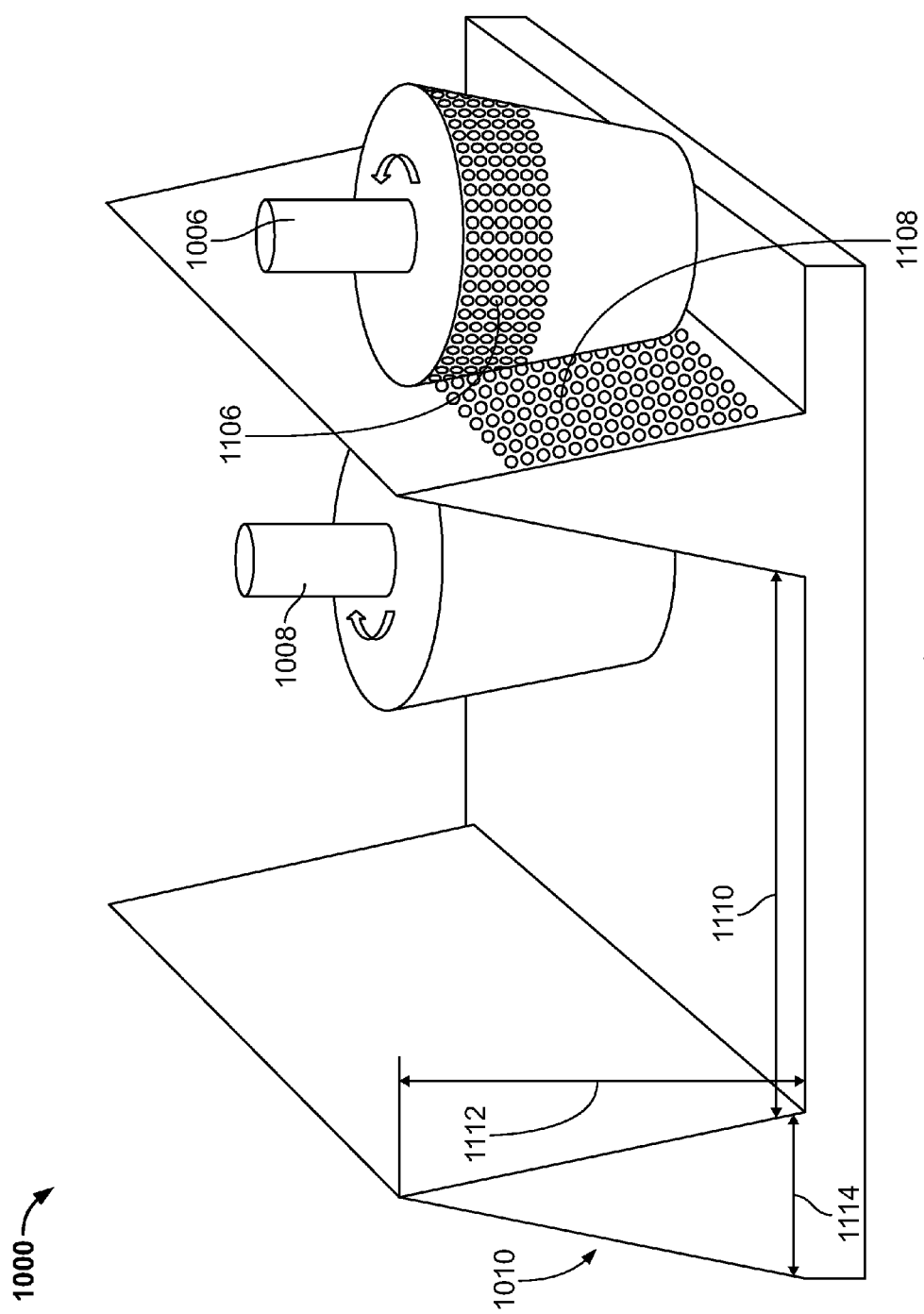
FIG. 11 is a detailed view of the example embossing system of FIG. 10.

FIG. 11 is a detailed view of the example forming system 1000 of FIG. 10. As mentioned above, the example rollers 1006, 1008 form sub-microstructures onto the microstructure 1010. During rotation of the rollers 1006, 1008 and as the microstructure 1010 moves relative to the rollers 1006, 1008, surface features 1106 are used to emboss sub-microstructures 1108 on the microstructure 1010. In particular, the surface features 1106 may include motheye sub-microstructures and/or motheye-forming structures or any other appropriate sub-microstructure-forming structures (e.g. ridges) to emboss the sub-microstructures 1108 onto the microstructure 1010. In some examples, heights of the sub-microstructures 1108 may vary along an extruded depth of the microstructure 1010 by moving the rollers 1006, 1008 (e.g., upward or downward, sideways) or varying the pressure relative to the microstructure 1010 as the microstructure 1010 moves relative to the forming system 1000. In this example, each ridge of the microstructure 1010 is separated by approximately 50-100 microns, as indicated by a dimension 1110, each ridge height is approximately 30-60 microns, as indicated by a dimension 1112, and each ridge is approximately 5-30 microns wide at the base, as indicated by a dimension 1114. In this example, spacing between peaks of each ridge of the microstructure 1010 is approximately 75-100 microns. The aforementioned dimensions and/or parameters are only examples and may vary by application, fluid properties of a fluid in which a vehicle is travelling through and/or predicted environmental operating conditions, etc.

Figure 12:
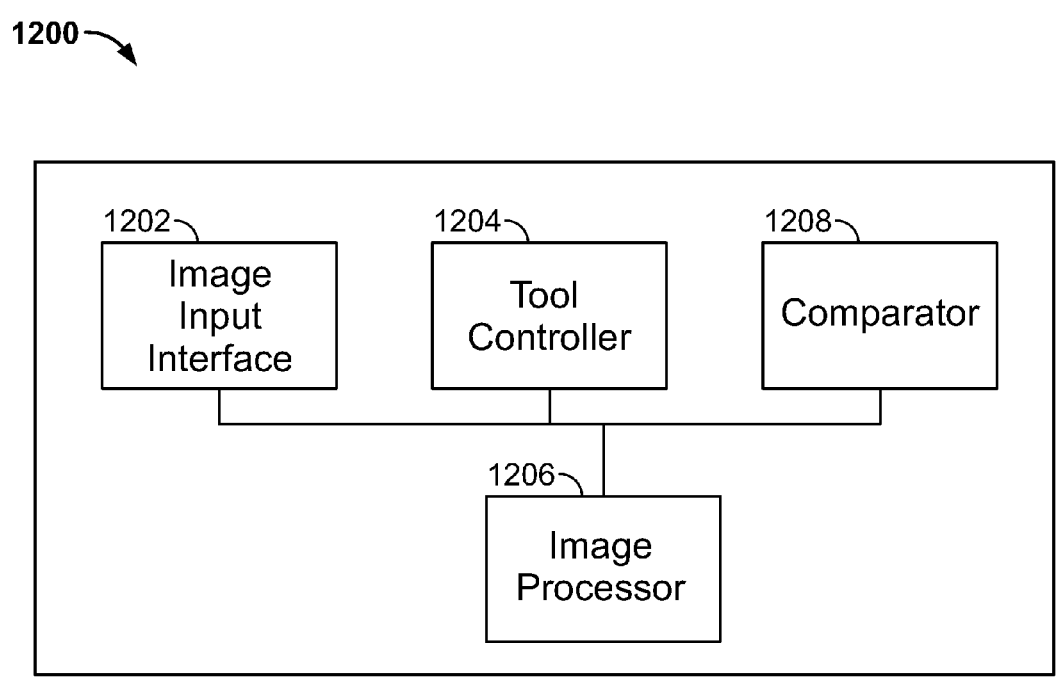
FIG. 12 is a schematic diagram of a system that may be used to implement the examples disclosed herein.

FIG. 12 is a schematic representation of a sub-microstructure imaging system 1200 that may be used to create optical/aesthetic effects and/or an image placement (e.g., placement of a representation of the image) on a microstructure and/or a surface with multiple microstructures. The example sub-microstructure imaging system 1200 includes an example image input interface 1202, an example tool controller 1204, an example image processor 1206 and an example comparator 1208. In this example, the microstructure imaging system 1200 is used to place and/or define an image on a microstructure by defining patterns of sub-microstructures and/or multiple groups of sub-microstructures, for example.

The image input interface 1202 of the illustrated example is used to receive an image and/or an image file (e.g., a JPEG file). In this example, the image processor 1206 receives the image and/or the image file from the image input interface 1202 and maps and/or defines where sub-microstructure and/or groups of sub-microstructures are to be positioned on, formed and/or shaped to create an optical effect (e.g., convey a representation of the image from the microstructure). In some examples, the image input interface 1202 may define the positioning and/or relative positioning of sub-microstructure groups to one another, thereby creating perceived depth to an observer. In this example, the image processor 1206 provides a mapping and/or defined sub-microstructure group placement(s) to the tool controller 1204 so that the tool controller 1204 may be used to provide (e.g., superimpose) sub-microstructures (e.g., emboss sub-microstructures, direct a tool, etc.) onto a microstructure and/or a surface with multiple microstructures to create an optical effect and/or an image thereon that may be viewed by an observer.

In some examples, a comparator 1208 verifies the sub-microstructures provided via the tool controller 1204 by visual inspection using a camera, for example. In particular, the comparator 1208 may use an image provided to the image input interface 1202 to a detected image of a microstructure, for example, to verify that a representation of an image is provided by the microstructure via placement of the sub-microstructures on the microstructure.

Figure 13:
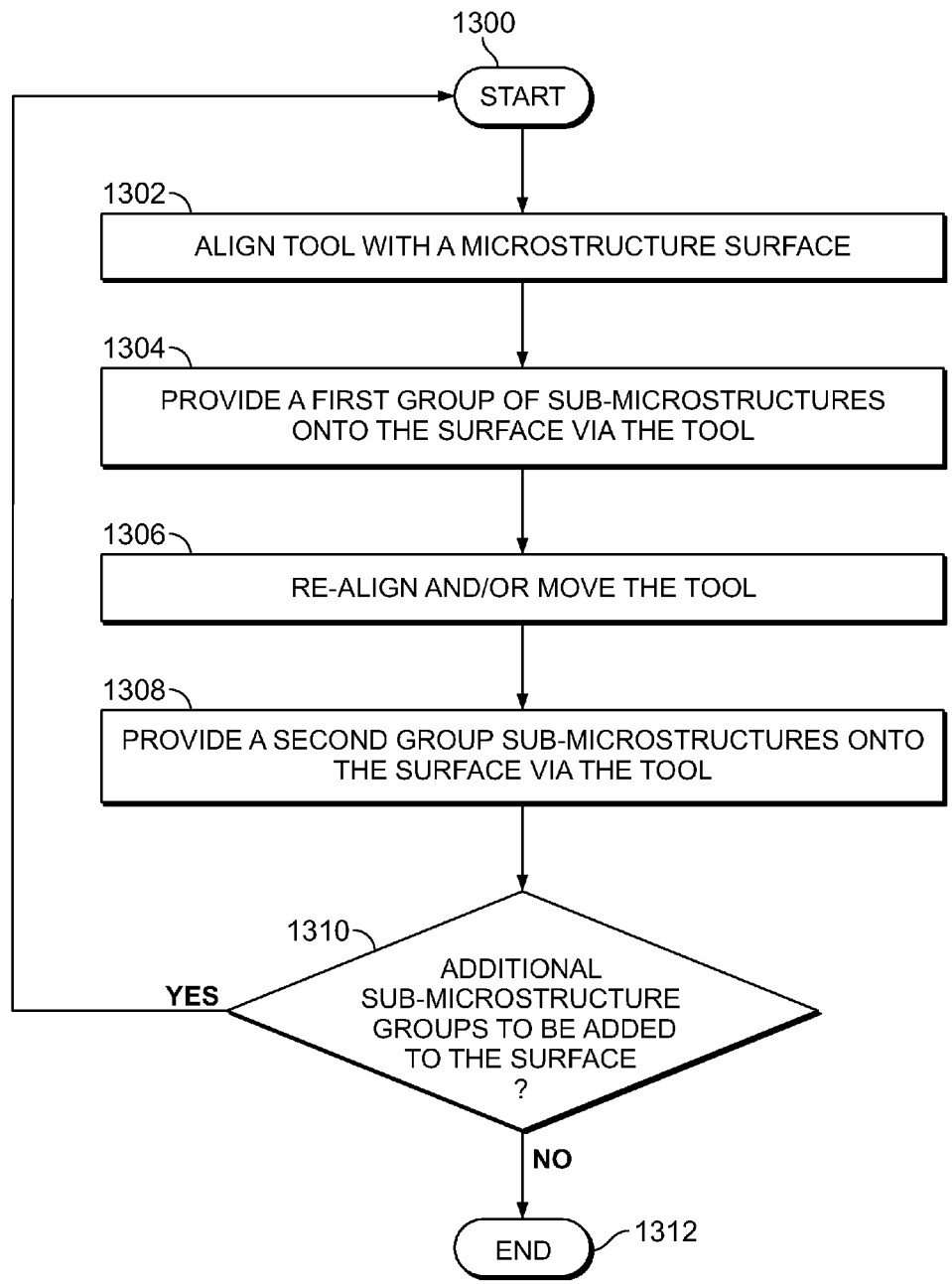
FIG. 13 is a flowchart representative of an example method that may be used to implement the examples disclosed herein.
Figure 14:
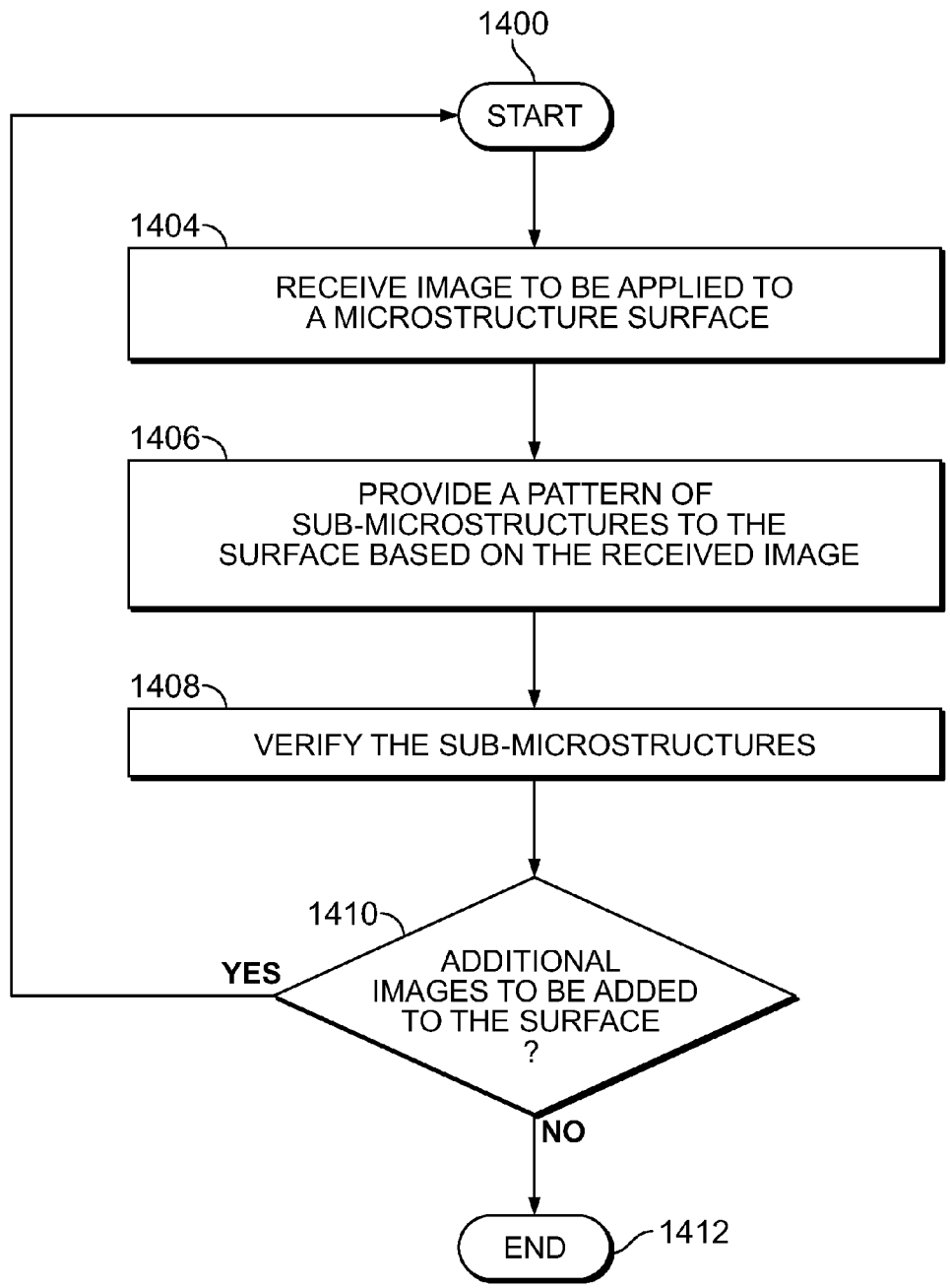
FIG. 14 is a flowchart representative of another example method that may be used to implement the examples disclosed herein.

While an example manner of implementing the sub-microstructure imaging system 1200 of FIG. 12 is illustrated in FIGS. 13 and 14, one or more of the elements, processes and/or devices illustrated in FIG. 12 may be combined, divided, re-arranged, omitted, eliminated and/or implemented in any other way. Further, the example image input interface 1202, the example tool controller 1204, the example image processor 1206, the example comparator 1208 and/or, more generally, the example sub-microstructure imaging system 1200 of FIG. 12 may be implemented by hardware, software, firmware and/or any combination of hardware, software and/or firmware. Thus, for example, any of the example image input interface 1202, the example tool controller 1204, the example image processor 1206, the example comparator 1208 and/or, more generally, the example sub-microstructure imaging system 1200 of FIG. 12 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, image input interface 1202, the example tool controller 1204, the example image processor 1206, and/or the example comparator 1208 is/are hereby expressly defined to include a tangible computer readable storage device or storage disk such as a memory, a digital versatile disk (DVD), a compact disk (CD), a Blu-ray disk, etc. storing the software and/or firmware. Further still, the example microstructure imaging system 1200 of FIG. 12 may include one or more elements, processes and/or devices in addition to, or instead of, those illustrated in FIGS. 13 and 14, and/or may include more than one of any or all of the illustrated elements, processes and devices.

Flowcharts representative of example methods for implementing the sub-microstructure imaging system 1200 of FIG. 12 are shown in FIGS. 13 and 14. In these examples, the methods may be implemented by using machine readable instructions that comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 13 and 14, many other methods of implementing the example sub-microstructure imaging system 1200 may alternatively be used. For example, the order of execution of the blocks may be changed, and/or some of the blocks described may be changed, eliminated, or combined.

As mentioned above, the example methods of FIGS. 13 and 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 13 and 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 13 is a flowchart representative of an example method that may be used to implement the examples disclosed herein. The example method begins at block 1300 where a microstructure (e.g., the microstructures 300, 400, 600, 700, 1010) is being formed (e.g., extruded and/or machined) and prepared to receive sub-microstructures and/or multiple sub-microstructure groups superimposed onto one or more surfaces of the microstructure to define a pattern (e.g., a pattern of sub-microstructures superimposed on a microstructure) that conveys a representation of an image, which may be perceived by a person and/or received by an image input interface such as the image input interface 1202 of FIG. 12 (block 1300).

A tool is aligned with a surface of the microstructure based on data from an image processor such as the image processor 1206 of FIG. 12 (block 1302). For example, a roll forming cylinder such as the cylinder 902 is aligned to the microstructure (e.g., the microstructure 906) by a tool controller such as the tool controller 1204 of FIG. 12. The tool of the illustrated example may be aligned through visual means and/or mechanical biasing (e.g., spring loaded against the microstructure as it is being extruded, etc.). In some examples, the microstructure is moved and/or positioned to be properly aligned relative to the tool. In other examples, machining rollers (e.g., the rollers 1006, 1008) of an embossing rig such as the embossing rig 1002 are aligned via visual and/or mechanical means to a microstructure as the microstructure is being extruded (e.g., an inline secondary process to form the sub-microstructures).

Next, the tool provides a first group of sub-microstructures onto the microstructure (block 1304). In this example, the first group of sub-microstructures is formed on the microstructure by embossing. In some examples, a force placed on an embossing tool is varied to adjust the degree to which the microstructure is embossed and/or embossed at different locations of the microstructure. In some examples, a line speed of the microstructure and/or a rotational speed of an embossing roller (e.g., the roller 902) is varied to control the degree to which sub-microstructures are provided to the microstructure at different locations of the microstructure, for example.

Next, the tool is moved to another position and/or aligned (e.g., aligned with another portion of the microstructure) by a tool controller such as the tool controller 1204 described above in connection with FIG. 12 (block 1306). Once, the tool has been re-aligned and/or moved, the tool is used to provide a second group of sub-microstructures onto the microstructure (block 1308). Alternatively, an additional tool may be used to provide the second group of sub-microstructures to the microstructure. In some examples, the second group of sub-microstructures may be aligned and/or shaped differently from the first group of sub-microstructures to create an optical effect.

Next, it is determined whether additional sub-microstructure groups are to be added (block 1310). This determination may occur by determining how much of the microstructure needs to be provided with sub-microstructures to convey an image, for example. In particular, a comparator such as the comparator 1208 may be used to compare the sub-microstructures present on the microstructure to the image, which is to be conveyed, to determine if additional sub-microstructures and/or sub-microstructures groups need to be added. If additional sub-microstructures are to be added (block 1310), the process repeats and control returns to the block 1300. If additional sub-microstructures are not to be added (block 1310), the process ends (block 1312).

FIG. 14 is another flowchart representative of another example method that may be used to implement the examples disclosed herein. The process begins at block 1400 where an image (e.g., an image representing a logo) is to be represented by a surface having microstructures along with portions that are relatively flat. First, the image to be applied to the surface is received by an image interface such as the image input interface 1202 described above in connection with FIG. 12 (block 1404). Next, groups of sub-microstructures (e.g., a pattern of sub-microstructures) are provided onto or proximate the surface based on instructions from an image processor such as the image processor 1206 and/or a tool controller such as the tool controller 1204 of FIG. 12 (block 1406).

The sub-microstructures and/or the sub-microstructure groups are verified (1408). In some examples, an inspection system such as a camera-based system verifies that the sub-microstructures and/or sub-microstructure groups are properly provided to the microstructure (e.g., by visual verification). Additionally or alternatively, the degree to which the sub-microstructures have been provided (e.g., embossed) onto the surface is determined and/or verified (e.g., surface area of the microstructure covered, height and/or depth of the sub-microstructures, etc.).

Next, it is determined whether additional images or portions of images are to be provided to the surface (block 1410). This determination may occur by determining how much of the microstructure needs to be provided with sub-microstructures to convey an image, for example. In particular, a comparator such as the comparator 1208 may be used to compare the sub-microstructures present to an image to determine if additional images need to be added to the surface. If additional images or portions of images are to be added to the surface (block 1410), the process repeats and control returns to block 1400. If additional images are not to be added to the surface (block 1410), the process ends (block 1412).

Figure 15:
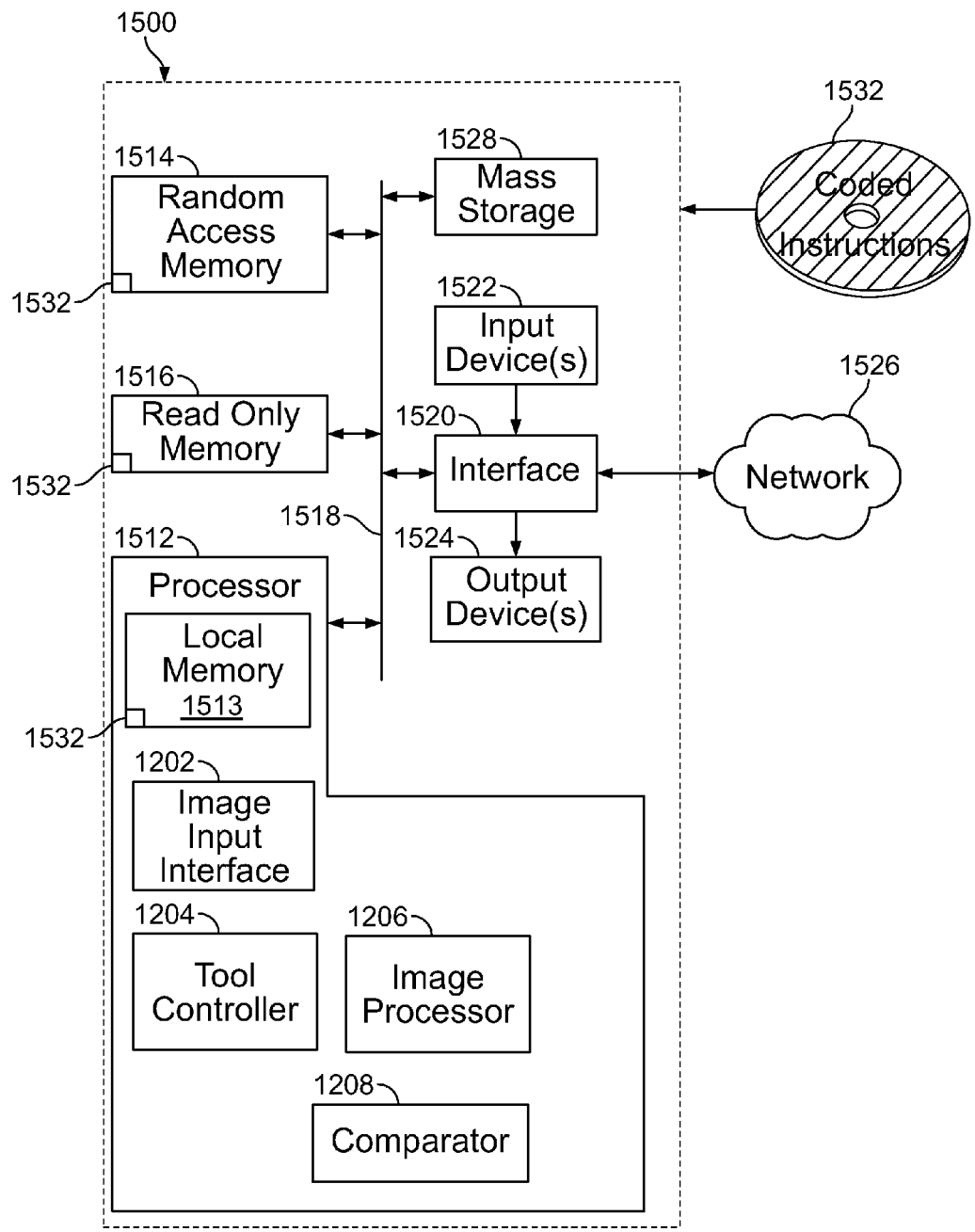
FIG. 15 is a block diagram of an example processor platform capable of executing machine readable instructions to implement the example methods of FIGS. 13 and 14.

FIG. 15 is a block diagram of an example processor platform 1500 capable of executing instructions to implement the methods of FIGS. 13 and 14 to implement the sub-microstructure imaging system 1200 of FIG. 12. The processor platform 1500 can be, for example, a server, a personal computer, a mobile device (e.g., a cell phone, a smart phone, a tablet such as an iPad™), a personal digital assistant (PDA), an Internet appliance, a digital video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). In this example, the processor 1512 also includes the image input interface 1202, the tool controller 1204, the image processor 1206 and the comparator 1208. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

Coded instructions 1532 to implement the methods of FIGS. 13 and 14 may be stored in the mass storage device 1528, in the volatile memory 1514, in the non-volatile memory 1516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described, the example methods and apparatus may be applied to other vehicles, watercraft, aerodynamic structures, etc.

What is claimed is:

1. An apparatus comprising:
    an aerodynamic microstructure defining an external surface of a vehicle;
    a first pattern of sub-microstructures superimposed on the microstructure, the first pattern having a first reflective property; and
    a second pattern of sub-microstructures superimposed on the microstructure, the second pattern having a second reflective property different from the first reflective property, wherein sub-microstructures of the first pattern of sub-microstructures have at least one of a different size or a different orientation from sub-microstructures of the second pattern of sub-microstructures, the first and the second patterns superimposed on the microstructure to convey a representation of a graphic.

2. The apparatus as defined in claim 1, wherein the sub-microstructures of the second pattern of sub-microstructures have different shapes compared to the sub-microstructures of the first pattern of sub-microstructures.

3. The apparatus as defined in claim 1, wherein the first and the second sub-microstructure patterns include relatively flat portions of the external surface.

4. The apparatus as defined in claim 1, wherein spacings between sub-microstructures of the first and the second sub-microstructure patterns are approximately equal to a wavelength of light.

5. The apparatus as defined in claim 1, wherein surfaces of sub-microstructures of the first and the second sub-microstructure patterns are coated with a reflective coating.

6. The apparatus as defined in claim 1, wherein spacings between sub-microstructures of the first and the second sub-microstructure patterns are less than about 0.4 microns.

7. The apparatus as defined in claim 1, further comprising a color layer proximate the external surface.

8. A method comprising:
    providing a first group of sub-microstructures having a first reflective property on an external surface of a microstructure; and
    providing a second group of sub-microstructures having a second reflective property on or proximate the external surface, the second reflective property different from the first reflective property, wherein sub-microstructures of the first group of sub-microstructures have at least one of a different size or a different orientation from sub-microstructures of the second group of sub-microstructures to create an optical effect.

9. The method as defined in claim 8, wherein the external surface spans a plurality of microstructures.

10. The method as defined in claim 8, wherein providing the first or the second groups of the sub-microstructures comprises embossing sub-microstructures onto the external surface.

11. The method as defined in claim 8, further comprising aligning a tool to provide the first group of sub-microstructures and re-aligning or moving the tool to provide the second group of sub-microstructures.

12. The method as defined in claim 8, wherein distances between sub-microstructures of the first or second sub-microstructure groups are between about 0.4 and 0.7 microns.

13. A method comprising:
    providing a first group of sub-microstructures having a first reflective property on an external surface of a microstructure; and
    providing a second group of sub-microstructures having a second reflective property on or proximate the external surface, the second reflective property different from the first reflective property, wherein sub-microstructures of the first group of sub-microstructures have at least one of a different size or a different orientation from sub-microstructures of the second group of sub-microstructures to create an optical effect.

14. The method as defined in claim 13, wherein providing the sub-microstructures comprises directing a tool to provide sub-microstructures of differing dimensions at different positions on the surface.

15. The method as defined in claim 13, wherein sub-microstructures of the first and the second sub-microstructure patterns have one or more of a parabolic shape, a triangular shape, a grooved shape, a sinusoidal shape, a cone shape, a cylindrical shape, or a plurality of indentations.

16. The method as defined in claim 13, wherein distances between sub-microstructures of the first and the second sub-microstructure patterns are between about 0.4 and 0.7 microns.

17. An apparatus comprising:
an aerodynamic microstructure defining an external surface of an aircraft, comprising:
a first sub-microstructure group superimposed on the aerodynamic microstructure, the first sub-microstructure group having a first reflective property; and
a second sub-microstructure group superimposed on the aerodynamic microstructure, the second sub-microstructure group having a second reflective property, the second reflective property different from the first reflective property, wherein sub-microstructures of the first sub-microstructure group have at least one of a different size or a different orientation from sub-microstructures of the second sub-microstructure group, a combination of the first and the second sub-microstructure groups to convey a representation of a graphic.

18. The apparatus as defined in claim 17, wherein the sub-microstructures of the second sub-microstructure group have different shapes compared to the sub-microstructures of the first group of sub-microstructures.

19. The apparatus as defined in claim 17, further comprising a flat portion of the aerodynamic microstructure to at least partially convey the representation.

* * * * *